US012568112B2

(12) United States Patent
Rozenbaum et al.

(10) Patent No.: US 12,568,112 B2
(45) Date of Patent: *Mar. 3, 2026

(54) DISTRIBUTED DENIAL OF SERVICE (DDOS) BASED ACCELERATED SOLUTION

(71) Applicant: Mellanox Technologies, Ltd., Yokneam (IL)

(72) Inventors: Chen Rozenbaum, Beer Yakov (IL); Gary Mataev, Haifa (IL); Ran Sandhaus, Tel Aviv (IL); Hanan Shteingart, Herzliya (IL)

(73) Assignee: Mellanox Technologies, Ltd., Yokneam (IL)

( * ) Notice: Subject to any disclaimer, the term of this patent is extended or adjusted under 35 U.S.C. 154(b) by 93 days.

This patent is subject to a terminal disclaimer.

(21) Appl. No.: 18/369,714

(22) Filed: Sep. 18, 2023

(65) Prior Publication Data

US 2025/0097261 A1      Mar. 20, 2025

(51) Int. Cl.
H04L 9/40 (2022.01)
H04L 41/16 (2022.01)

(52) U.S. Cl.
CPC .......... H04L 63/1458 (2013.01); H04L 41/16 (2013.01); H04L 63/1416 (2013.01); H04L 63/1425 (2013.01)

(58) Field of Classification Search
CPC ............. H04L 63/1458; H04L 63/1416; H04L 63/1425; H04L 63/1408; H04L 41/16
See application file for complete search history.

(56) References Cited

U.S. PATENT DOCUMENTS

| | | |
|---|---|---|
| 9,282,014 B2 | 3/2016 | Abrams et al. |
| 9,900,343 B1 | 2/2018 | Friedel |
| 2007/0055789 A1* | 3/2007 | Claise ..................... H04L 47/10 |
| | | 709/234 |
| 2015/0229669 A1 | 8/2015 | Xin et al. |
| 2018/0278647 A1 | 9/2018 | Gabaev et al. |

(Continued)

FOREIGN PATENT DOCUMENTS

| | | |
|---|---|---|
| CN | 115150278 A | 10/2022 |
| EP | 4105850 A1 | 12/2022 |
| EP | 4199427 A1 | 6/2023 |

OTHER PUBLICATIONS

Extended European Search Report for European Application No. 24201011.4, mailed Feb. 3, 2025, 9 Pages.

(Continued)

*Primary Examiner* — Kostas J Katsikis
(74) *Attorney, Agent, or Firm* — Lowenstein Sandler LLP

(57) ABSTRACT

Apparatuses, systems, and techniques for detecting that a host device is subject to a distributed denial of service (DDOS) attack using a machine learning (ML) detection system are described. A computing system includes a switch with port interfaces, a central processing unit (CPU) that implements a machine learning (ML) detection system, and network monitoring logic. The network monitoring logic can extract features from network data and send the extracted features to the ML detection system. The ML detection system determines whether the host device is subject to a DDOS attack using the extracted features. The ML detection system can send an alert to the host device responsive to a determination that the host device is subject to the DDOS attack.

22 Claims, 12 Drawing Sheets

1000

EXTRACT, BY A DATA PROCESSING UNIT (DPU) COUPLED TO A HOST DEVICE, A PLURALITY OF FEATURES FROM FIRST DATA IN NETWORK TRAFFIC DATA RECEIVED ON A NETWORK INTERFACE OF THE DPU AND SECOND DATA STORED IN REGISTERS IN AN ACCELERATION HARDWARE ENGINE OF THE DPU, THE FIRST DATA BEING DIRECTED TO THE HOST DEVICE FROM A SECOND DEVICE 1002

DETERMINING, USING A MACHINE LEARNING (ML) DETECTION SYSTEM, WHETHER THE HOST DEVICE IS SUBJECT TO A DISTRIBUTED DENIAL OF SERVICE (DDOS) ATTACK BASED ON THE PLURALITY OF FEATURES 1004

PERFORM, BY THE DPU, AN ACTION ASSOCIATED WITH AN ENFORCEMENT RULE ON SUBSEQUENT NETWORK TRAFFIC DATA DIRECTED TO THE HOST DEVICE FROM THE SECOND DEVICE, RESPONSIVE TO A DETERMINATION THAT THE HOST DEVICE IS SUBJECT TO THE DDOS ATTACK 1006

(56)         References Cited

U.S. PATENT DOCUMENTS

| 2020/0374310 A1 | 11/2020 | Misra et al. |
| 2022/0207141 A1 | 6/2022 | Chung et al. |
| 2022/0239690 A1 * | 7/2022 | Arnon ..................... H04L 69/22 |
| 2022/0263846 A1 * | 8/2022 | Armelin .............. H04L 63/1425 |
| 2023/0146962 A1 | 5/2023 | Reddy et al. |
| 2023/0188561 A1 * | 6/2023 | Finkelshtien ....... H04L 63/1441 |
| | | 726/22 |
| 2023/0259625 A1 | 8/2023 | Gechman et al. |
| 2023/0269225 A1 | 8/2023 | Fong et al. |
| 2024/0244070 A1 * | 7/2024 | Mohapatra .......... H04L 63/1425 |
| 2024/0430282 A1 | 12/2024 | Wang et al. |
| 2025/0097260 A1 * | 3/2025 | Rozenbaum ........ H04L 63/1458 |

OTHER PUBLICATIONS

Extended European Search Report for European Application No. 24201152.6, mailed Jan. 27, 2025, 10 Pages.

* cited by examiner

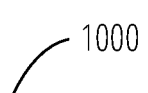

1000

EXTRACT, BY A DATA PROCESSING UNIT (DPU) COUPLED TO A HOST DEVICE, A PLURALITY OF FEATURES FROM FIRST DATA IN NETWORK TRAFFIC DATA RECEIVED ON A NETWORK INTERFACE OF THE DPU AND SECOND DATA STORED IN REGISTERS IN AN ACCELERATION HARDWARE ENGINE OF THE DPU, THE FIRST DATA BEING DIRECTED TO THE HOST DEVICE FROM A SECOND DEVICE 1002

DETERMINING, USING A MACHINE LEARNING (ML) DETECTION SYSTEM, WHETHER THE HOST DEVICE IS SUBJECT TO A DISTRIBUTED DENIAL OF SERVICE (DDOS) ATTACK BASED ON THE PLURALITY OF FEATURES 1004

PERFORM, BY THE DPU, AN ACTION ASSOCIATED WITH AN ENFORCEMENT RULE ON SUBSEQUENT NETWORK TRAFFIC DATA DIRECTED TO THE HOST DEVICE FROM THE SECOND DEVICE, RESPONSIVE TO A DETERMINATION THAT THE HOST DEVICE IS SUBJECT TO THE DDOS ATTACK 1006

FIG. 10

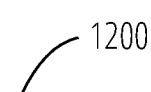
1200

EXTRACT, BY A SWITCH COUPLED TO A HOST DEVICE, A PLURALITY OF FEATURES FROM NETWORK TRAFFIC DATA RECEIVED ON A PORT INTERFACE OF THE SWITCH, THE NETWORK TRAFFIC DATA BEING DIRECTED TO THE HOST DEVICE FROM A SECOND DEVICE 1202

DETERMINING, USING A MACHINE LEARNING (ML) DETECTION SYSTEM, WHETHER THE HOST DEVICE IS SUBJECT TO A DISTRIBUTED DENIAL OF SERVICE (DDOS) ATTACK BASED ON THE PLURALITY OF FEATURES 1204

CAUSE AN ACTION ASSOCIATED WITH AN ENFORCEMENT RULE TO BE PERFORMED ON SUBSEQUENT NETWORK TRAFFIC DATA DIRECTED TO THE HOST DEVICE FROM THE SECOND DEVICE, RESPONSIVE TO A DETERMINATION THAT THE HOST DEVICE IS SUBJECT TO THE DDOS ATTACK 1206

FIG. 12

DISTRIBUTED DENIAL OF SERVICE (DDOS) BASED ACCELERATED SOLUTION

RELATED APPLICATIONS

This application is related to co-pending U.S. application Ser. No. 18/369,710, filed concurrently.

TECHNICAL FIELD

At least one embodiment pertains to processing resources used to perform and facilitate operations for detecting whether a host device is subject to a malicious network attack. For example, at least one embodiment pertains to processors or computing systems used to provide and enable a switch to determine, using a machine learning (ML) detection system, whether a host device is subject to a distributed denial of service (DDOS) attack based on features extracted from network data, according to various novel techniques described herein.

BACKGROUND

Network security, which involves protecting a communications network and the devices that connect to it from various threats, remains a challenging problem. There are many different types of possible network attacks, including but not limited to distributed denial of service (DDOS) attacks, man-in-the-middle attacks, unauthorized accesses, and so forth. The strategies and tactics employed by malicious actors continue to evolve. Existing techniques for protecting network communications can be improved.

BRIEF DESCRIPTION OF DRAWINGS

Various embodiments in accordance with the present disclosure will be described with reference to the drawings, in which:

FIG. 10 is a flow diagram of a method of determining whether a host device is subject to a DDOS attack in accordance with one embodiment.

FIG. 12 illustrates a method in accordance with one embodiment.

DETAILED DESCRIPTION

Figure 1:
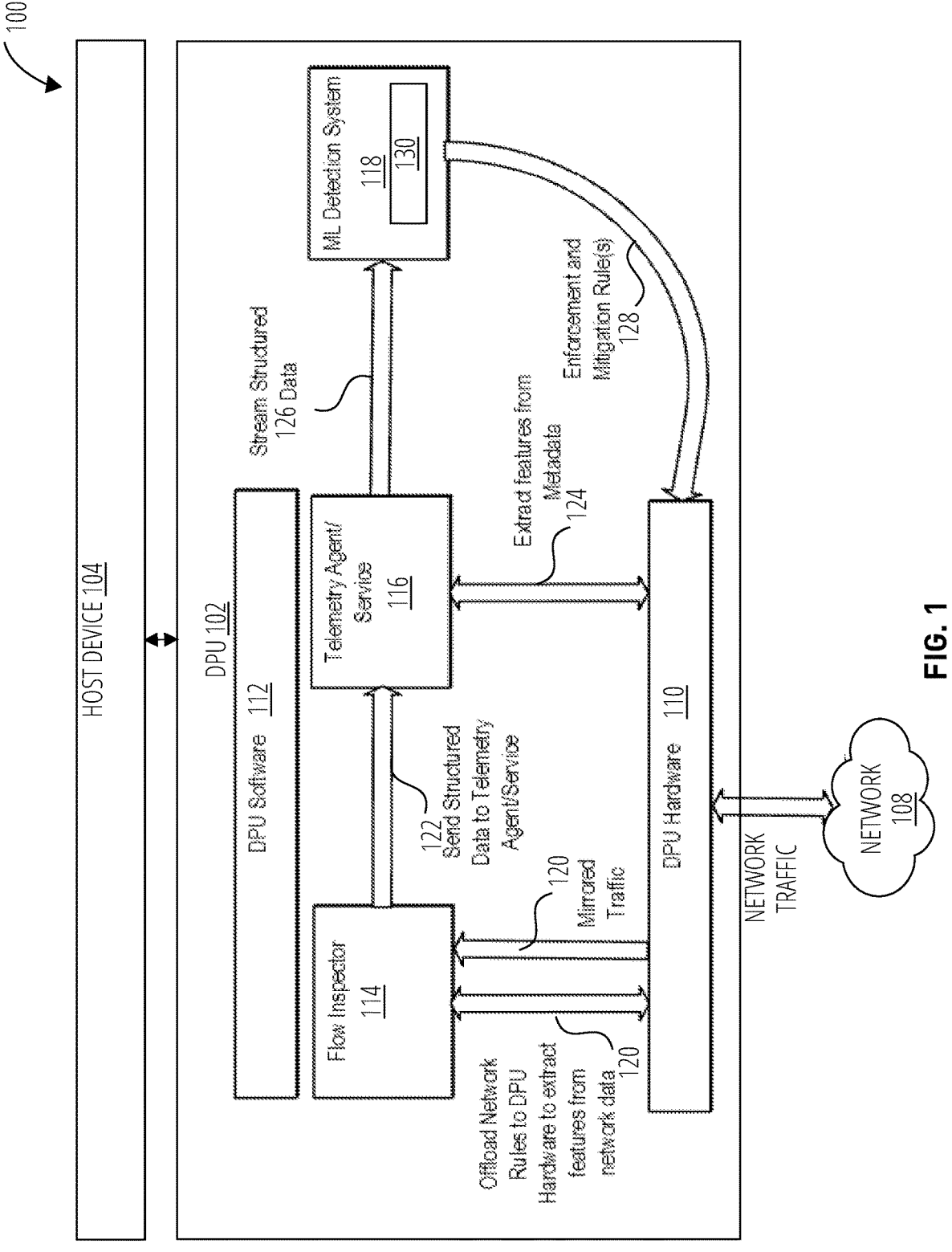
FIG. 1 is a block diagram of an example DPU-based system architecture according to at least one embodiment.

Data center security includes a wide range of technologies and solutions to protect a data center from external and internal threats or attacks. A data center is a facility that stores different devices such as switches, routers, load balancers, firewalls, servers, networked computers, storage, network interface cards (NICs), DPUs, GPUs, and other resources as part of the information technology (IT) infrastructure. For private companies moving to the cloud, data centers reduce the cost of running their own centralized computing networks and servers. Data centers provide services, such as storage, backup and recovery, data management, networking, security, orchestration, or the like. Because data centers hold sensitive or proprietary information, such as customer data or intellectual property, servers must be secured and protected all the time from known and unknown network attacks, malware, malicious activity, and the like. Data centers are complex and include many types of devices and services. Security components and advanced technologies can be used to protect devices and services.

One type of cybersecurity requirement is to prevent malicious network attacks, which have become a big concern in today's interconnected world. One conventional solution for detecting network attacks is signature-based detection. Signature-based detection is based on past experience and extensive knowledge of each attack. Conventional signature-based detection systems fail to address the increased variability of today's cyberattacks and have several disadvantages. The conventional system fails to detect new attacks since signature-based detection requires a new signature for each new attack. The signatures must be maintained and updated continuously to support new attacks. The convention system can be highly time-consuming and expensive due to the demand for security experts required for creating, test, and verifying the signatures. There can also be time constraints to these solutions since there can be a large amount of time between the discovered attack and a signature created, tested, and verified for deployment.

A DDOS attack is a type of cyberattack where a large number of compromised computers or devices (also known as "botnets") are used to "flood" a target website or server with traffic, overwhelming it and causing it to become unavailable to legitimate users. The goal of a DDOS attack is to disrupt the normal functioning of the targeted service, website, or network by overwhelming its resources and causing it to become inaccessible or extremely slow. The attacker typically gains control over these devices by infecting them with malware, which turns them into "zombies" or "bots" that can be remotely controlled. These devices then flood the target server with traffic, often from multiple locations and Internet Protocol (IP) addresses, making it difficult to block the attack.

DDOS attacks can be used for various purposes, including extortion, revenge, activism, or simply to disrupt the target's operations. They can be very effective, causing significant damage to businesses and organizations that rely on their websites and online services to operate. To identify DDOS attacks, certain signs and symptoms can indicate that a network or system is under attack. Here are some common indicators of a DDOS attack: 1. Unusually high traffic volume: A DDOS attack involves sending a large volume of traffic to a target server or website. If a sudden spike in traffic is observed, it could be a sign of a DDOS attack. 2. Slow or unresponsive website: If a website or online service runs slow or becomes unresponsive, it could be due to a DDOS attack. The large traffic volume overwhelms the server, making it difficult to respond to legitimate user requests. 3. Network connectivity issues: If a network is experiencing connectivity issues, such as dropped connections or latency, it could be a sign of a DDOS attack. 4. Unusual traffic patterns: If traffic patterns are unusual or do not match the typical traffic patterns, it could be a sign of a DDOS attack. For example, if a large number of requests coming from the same IP address is observed, it could be an indicator of a DDOS attack. 5. Unusual Domain Name System (DNS) traffic: If a large volume of DNS traffic coming from unexpected sources is observed, it could be an indication of a DNS amplification attack, which is a type of DDOS attack. If the network or system is under attack, it is essential to take immediate action to mitigate the damage. Actions can include implementing DDOS mitigation strategies like blocking traffic from specific IP addresses or ranges.

There are various methods available to identify a DDOS attack. Here are some common methods: 1. Traffic monitoring: One of the most effective ways to identify a DDOS attack is to monitor network traffic for unusual patterns. Network administrators can use tools like intrusion detection systems (IDS) and network traffic analysis tools to identify and analyze traffic anomalies. 2. Baseline traffic analysis: By establishing a baseline of normal network traffic patterns, administrators can quickly detect deviations from the baseline, indicating a possible DDOS attack. 3. Network behavior analysis: Network behavior analysis tools can be used to detect unusual traffic patterns, such as an increase in the number of connections or a sudden surge in traffic. 4. Intrusion prevention systems: Intrusion prevention systems (IPS) can detect and block traffic from malicious sources before it reaches the target system, preventing DDOS attacks from occurring. 5. Flow-based monitoring: Flow-based monitoring uses NetFlow or similar technologies to track network traffic patterns and identify potential DDOS attacks based on the volume and frequency of traffic. 6. Application-layer monitoring: Application-layer monitoring can detect DDOS attacks that target specific applications or services, such as web servers or DNS servers. 7. Signature-based detection: Signature-based detection uses known patterns of DDOS attacks to identify and block malicious traffic.

Aspects and embodiments of the present disclosure address the above and other deficiencies by providing an AI/ML based DDOS detection and mitigation solution. Aspects and embodiments of the present disclosure can provide an acceleration hardware engine of an integrated circuit (e.g., DPU or switch) to determine whether a host device is subject to a DDOS attack. In particular, the acceleration hardware engine of a DPU can extract feature data from the network traffic and feature data from registers of the DPU and determine whether a host device is subject to a DDOS attack based on the feature data. Studies of recent network attacks show that using machine learning for network attack detection by learning the patterns of the network behaviors can prevent the advanced techniques used by attackers in today's interconnected world. Machine learning involves training a computing system—using training data—to identify features in data that may facilitate detection and classification. Training can be supervised or unsupervised. Machine learning models can use various computational algorithms, such as decision tree algorithms (or other rule-based algorithms), artificial neural networks, or the like. During an inference stage, new data is input into a trained machine learning model, and the trained machine learning model can classify items of interest using features identified during training. Anomaly detection and enforcement techniques based on DPU for networking filtering and acceleration, a GPU-based framework for AI, can provide network protection for data centers in today's interconnected world. In addition, modern data centers and cloud infrastructures contain heterogeneous computing capabilities, including ARM and GPU-native infrastructure.

Aspects and embodiments of the present disclosure can provide an AI/ML-based DDOS detection and mitigation using a hardware-accelerated security service with data extraction logic and a telemetry service (or telemetry agent). The data extraction logic can be the DPU hardware-based DOCA Flow Inspector service. The data extraction logic can filter, classify and monitor traffic, build data structure according to configuration, and send it to a telemetry service (e.g., DOCA Telemetry Service). The telemetry service (e.g., DOCA Telemetry Service) can query DPU counters and send them along with the data from the Flow Inspector service to an AI/ML application (hosted locally or remotely). The AI/ML application can detect DDOS attacks based on pre-trained AI/ML models using advanced AI/ML algorithms. Once a DDOS attack is detected, the AI/ML application can send network mitigation rules to the DPU hardware. During operation, a configuration to Flow Inspector service can be added to identify which traffic patterns are to be monitored. For each traffic pattern, the Flow Inspector service can configure the relevant fields to be extracted to be sent to the Telemetry service. The Telemetry service can query the DPU counters, aggregate the information from the Flow Inspector, and send it to the AI/ML application. The AI/ML application can receive the data and, using advanced AI/ML algorithms, decide whether this is an actual DDOS attack. The AI/ML application can send hardware-based network rules back to the DPU to mitigate the attack.

In general, the embodiments of the AI/ML-based solutions described herein can be used to detect DDOS attacks more effectively than traditional methods because they can quickly identify anomalies and patterns in network traffic that may indicate an attack. The embodiments of the AI/ML-based solutions described herein can analyze network traffic in real time, allowing them to detect DDOS attacks as they are happening. This enables security teams to respond quickly and mitigate the damage caused by the attack. DDOS attacks can generate a massive volume of traffic, making it difficult for traditional methods to identify and mitigate the attack. The embodiments of the AI/ML-based solutions described herein can scale to handle large amounts of traffic and quickly identify patterns of malicious activity. The embodiments of the AI/ML-based solutions described herein can be automated, allowing security teams to respond to DDOS attacks quickly and efficiently. This reduces the risk of human error and enables security teams to focus on other critical tasks. Attackers constantly evolve their tactics, making it challenging to detect and mitigate DDOS attacks using traditional methods. The embodiments of the AI/ML-based solutions described herein can adapt to new attack patterns and identify previously unknown attack methods. The embodiments of the AI/ML-based solutions described herein can analyze large volumes of data more accurately than humans, allowing them to detect DDOS attacks more effectively. This reduces the risk of false positives and enables security teams to focus on real threats.

Aspects and embodiments of the present disclosure can provide an acceleration hardware engine operatively coupled to a host interface and a network interface. The acceleration hardware engine can extract features from network traffic data received over the network interface and directed to a host device. Using an ML detection system, the acceleration hardware engine can determine that the host device is subject to a DDOS attack based on the features extracted from the network traffic data. The acceleration hardware engine can perform an operation associated with an enforcement rule. In at least one embodiment, the acceleration hardware engine is implemented on a DPU. In at least one embodiment, the acceleration hardware engine is implemented on a switch.

Aspects and embodiments of the present disclosure can provide a hardware-accelerated security service that can extract features from network data directed to a host device and data stored in registers of the acceleration hardware engine and send the features to the cybersecurity platform to determine whether the host device is subject to the DDOS attack. The hardware-accelerated security service receives an enforcement rule from the cybersecurity platform responsive to a determination by the cybersecurity platform that the host device is subject to a DDOS attack. The hardware-accelerated security service performs an action, associated with the enforcement rule, on subsequent network traffic directed to the host device. The hardware-accelerated security service can operate on a DPU and be an agentless hardware product that inspects the network data directed to the host device. In at least one embodiment, the hardware-accelerated security service is the NVIDIA DOCA™. Alternatively, other hardware-accelerated security services can be used. In some cases, the cybersecurity platform detects malicious network activity during an attack and can provide an enforcement rule, in response, to protect the host device from the DDOS attack. The integrated circuit can be a DPU. The DPU can be a programmable data center infrastructure on a chip. The integrated circuit can include a network interface operatively coupled to a central processing unit (CPU) to handle network data path processing, and the CPU can control path initialization and exception processing.

Aspects and embodiments of the present disclosure can provide a first agent (e.g., NVIDIA DOCA Flow Inspector) of the hardware-accelerated security service and a second agent (e.g., NVIDIA DOCA Telemetry agent). The first agent can leverage the acceleration hardware engine (e.g., DPU hardware) to offload and filter network traffic based on predefined filters using the hardware capabilities of the acceleration hardware engine. The second agent can extract telemetry data from embedded counters (or other registers) on the acceleration hardware engine, and combine the telemetry data with the filtered network traffic to the cybersecurity platform. The filtered network traffic can be structured data that can be streamed with the counters metadata to the ML detection system (e.g., locally hosted or a remote cybersecurity platform) for analysis using accelerated memory accessing methodologies, as described herein. The ML detection system can process a large volume of data and provide immediate and dynamic protection by providing enforcement network rules to the acceleration hardware engine (e.g., DPU). In some cases, the ML detection system is implemented in a remote cybersecurity platform that can process a large volume of data on a GPU and provide immediate and dynamic protection by sending enforcement network rules back to the acceleration hardware engine (e.g., DPU). The ML detection system can detect threats or attacks using anomaly detection methodologies. The ML detection system can provide feedback results to the accelerated hardware engine (e.g., DPU hardware) to enforce and block malicious activity or other types of cyberattacks. This feedback can potentially change or otherwise alter the streamed data being sent to the ML detection system to refine the feedback results further. The flow inspector and telemetry agent hosted on the DPU and the ML detection system (e.g., hosted on the DPU itself or cybersecurity platform hosted on the GPU) can provide a full solution for traffic filtering, counters extraction, and data stream to the ML detection system for machine learning-based anomaly detection. Once the machine learning-based anomaly detection identifies a DDOS attack, mitigation rules can be used to configure the DPU to block the attack immediately.

DPU-BASED SYSTEM ARCHITECTURES

FIG. 1 is a block diagram of an example DPU-based system architecture 100 according to at least one embodiment. The DPU-based system architecture 100 (also referred to as "system" or "computing system" herein) includes a first integrated circuit, labeled DPU 102, and a second integrated circuit, labeled host device 104. The DPU-based system architecture 100 can be part of a data center and include one or more data stores, one or more server machines, and other components of data center infrastructure. The DPU 102 can be coupled to a network 108. The network 108 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In at least one embodiment, DPU 102 is integrated as a System on a Chip (SoC) that is considered a data center infrastructure on a chip. In at least one embodiment, DPU 102 includes DPU hardware 110 and DPU software 112 (e.g., software framework with acceleration libraries). The DPU hardware 110 can include a CPU (e.g., a single-core or multi-core CPU), one or more hardware accelerators, memory, one or more host interfaces, and one or more network interfaces. The software framework and acceleration libraries can include one or more hardware-accelerated services, including hardware-accelerated security service (e.g., NVIDIA DOCA), hardware-accelerated virtualization services, hardware-accelerated networking services, hardware-accelerated storage services, hardware-accelerated artificial intelligence/machine learning (AI/ML) services, and hardware-accelerated management services. As illustrated in FIG. 1, the hardware-accelerated security service can include data extraction logic 114 (e.g., DOCA Flow Inspector) and telemetry agent 116 (agent or service), and the AI/ML service can include an ML detection system 118. The data extraction logic 114 and telemetry agent 116 can extract feature data from network traffic received over the network 108 from a second device (or multiple devices) and/or metadata from the DPU hardware 110. The ML detection system 118 includes one or more ML detection models trained to determine whether a host device 104 is subject to a DDOS attack based on the features data extracted from the data extraction logic 114 and/or telemetry agent 116. Additional details of the operations of data extraction logic 114, telemetry agent 116, and ML detection system 118 are described below.

In at least one embodiment, the data extraction logic 114 (e.g., DOCA Flow Inspector) extracts network data 120 from network traffic received over the network 108 via one or more network interface(s). The network data 120 can be received over network 108 from a second device (not illustrated in FIG. 1). The second device can be the initiator of a DDOS attack. In at least one embodiment, the data extraction logic 114 receives a copy of the network data 120 (e.g., a mirrored copy of the network data 120 directed to the host device 104). The data extraction logic 114 can be configured by a configuration file that specifies what type of data should be extracted from the network data 120. The configuration file can specify one or more filters that extract for inclusion or remove from inclusion specified types of data from the network data 120. Since the network data can be a copy of the network data, the network traffic that does not meet the filtering criteria can be discarded or removed. The network traffic that meets the filtering criteria can be structured and streamed to the ML detection system 118 for analysis. The data extraction logic 114 can generate a data structure 122 with the extracted data. The data structure 122 can be any type of data structure, such as a struct, an object, a message, or the like. For example, the configuration file can specify that all HyperText Transport Protocol (HTTP) traffic be extracted from the network data 120. The configuration file can specify that all traffic on port 80, port 443, and/or port 22 should be extracted from the network data 120 for analysis. A large percentage of attacks target these three ports: SSH-22/TCP, HTTPS-443/TCP, and HTTP-80/TCP.

In at least one embodiment, telemetry agent 116 extracts metadata 124 from one or more registers of the DPU hardware 110. In at least one embodiment, the telemetry agent 116 can be configured or programmed by a configuration file (same or different configuration file than the data extraction logic 114) that specifies what metadata should be extracted from the DPU's hardware, such as from embedded counters, registers, or the like. For example, the configuration file can specify which values from counters, registers, or the like should be extracted by the telemetry agent to be streamed with the extracted network data. Some metadata 124 can be associated or related to the network data 120. Some metadata 124 can be associated or related to the underlying hardware and not related to the network traffic. In at least one embodiment, the telemetry agent 116 combines the data structure 122 and metadata 124 into stream data 126. The telemetry agent 116 sends the stream data 126 to the ML detection system 118 (e.g., accelerated AI/ML pipeline(s)) to determine whether the host device 104 is subject to the DDOS attack.

In at least one embodiment, responsive to a determination by the ML detection system 118 that the host device 104 is subject to the DDOS attack, the ML detection system 118 sends an enforcement rule 128 to the DPU hardware 110. The DPU hardware 110 can perform an action, associated with the enforcement rule 128, on subsequent network traffic directed to the host device 104 from the second device. In at least one embodiment, the ML detection system 118 can output an indication of the DDOS attack on the host device 104. In at least one embodiment, ML detection system 118 can send the indication to the hardware-accelerated security service, and the hardware-accelerated security service can send an alert to another system, such as a security information and event management (SIEM) or extended detection and response (XDR) system. The alert can include information about the DDOS attack. In at least one embodiment, ML detection system 118 can send an indication in addition to sending the enforcement rule 128 to the DPU hardware 110.

In at least one embodiment, the data extraction logic 114 can extract one or more features and send the extracted features to the ML detection system 118 with or without features extracted by the telemetry agent 116. For example, data extraction logic 114 can extract HTTP data, and the telemetry agent 116 can extract corresponding metadata 124 from the DPU hardware registers and counters. The telemetry agent 116 can generate the stream data 126 and send it to the ML detection system 118. The stream data 126 can include features extracted by the data extraction logic 114. The stream data 126 can include features extracted by the data extraction logic 114 and the telemetry agent 116. In another embodiment, the ML detection system 118 includes feature extraction logic to extract a set of features from the stream data 126. The stream data 126 can be raw data extracted by the hardware-accelerated security service. In at least one embodiment, extracted features are input into a DDOS detection system 130. In at least one embodiment, the DDOS detection system 130 includes a tree-based ML model trained to determine whether the host device 104 is subject to a DDOS attack based on the extracted features.

In at least one embodiment, the DPU hardware 110 includes a data buffer to store the network data 120. In at least one embodiment, the DPU hardware 110 creates a copy of the network data 120 so that it can be filtered by the data extraction logic 114 to extract the structured data (e.g., data structure 122).

In at least one embodiment, data extraction logic 114 can extract some features from network data 120 and create a feature set, including categorical features, numerical features, binary features, or the like. The telemetry agent 116 can extract numerical features from the telemetry data (i.e., metadata 124). These numerical features can be combined into the feature set. In at least one embodiment, the DDOS detection system 130 includes an ML model trained to determine whether the feature set indicates a DDOS attack. In at least one embodiment, the ML model includes a tree-based model. In another embodiment, the DDOS detection system 130 includes a neural network (e.g., a fully-connected neural network layer or a convolutional neural network (CNN)). Additional details of the ML model are described below with respect to FIG. 6.

It should be noted that, unlike a CPU or a GPU, the DPU 102 is a new class of programmable processor that combines three key elements, including, for example: 1) an industry-standard, high-performance, software-programmable CPU (single-core or multi-core CPU), tightly coupled to the other SoC components; 2) a high-performance network interface capable of parsing, processing and efficiently transferring data at line rate, or the speed of the rest of the network, to GPUs and CPUs; and 3) a rich set of flexible and programmable acceleration engines that offload and improve applications performance for AI and machine learning, security, telecommunications, and storage, among others. These capabilities can enable an isolated, bare-metal, cloud-native computing platform for cloud-scale computing. In at least one embodiment, DPU 102 can be used as a stand-alone embedded processor. In at least one embodiment, DPU 102 can be incorporated into a network interface controller (also called a Smart Network Interface Card (SmartNIC)) used as a server system component. A DPU-based network interface card (network adapter) can offload processing tasks that the server system's CPU normally handles. Using its processor, a DPU-based SmartNIC may be able to perform any combination of encryption/decryption, firewall, transport control protocol/Internet Protocol (TCP/IP), and HTTP processing. SmartNICs can be used for high-traffic web servers, for example.

In at least one embodiment, DPU 102 can be configured for traditional enterprises' modern cloud workloads and high-performance computing. In at least one embodiment, DPU 102 can deliver a set of software-defined networking, storage, security, and management services at a data-center scale with the ability to offload, accelerate, and isolate data center infrastructure. In at least one embodiment, DPU 102 can provide multi-tenant, cloud-native environments with these software services. In at least one embodiment, DPU 102 can deliver data center services of up to hundreds of CPU cores, freeing up valuable CPU cycles to run business-critical applications. In at least one embodiment, DPU 102 can be considered a new type of processor that is designed to process data center infrastructure software to offload and accelerate the compute load of virtualization, networking, storage, security, cloud-native AI/ML services, and other management services.

Figure 2:
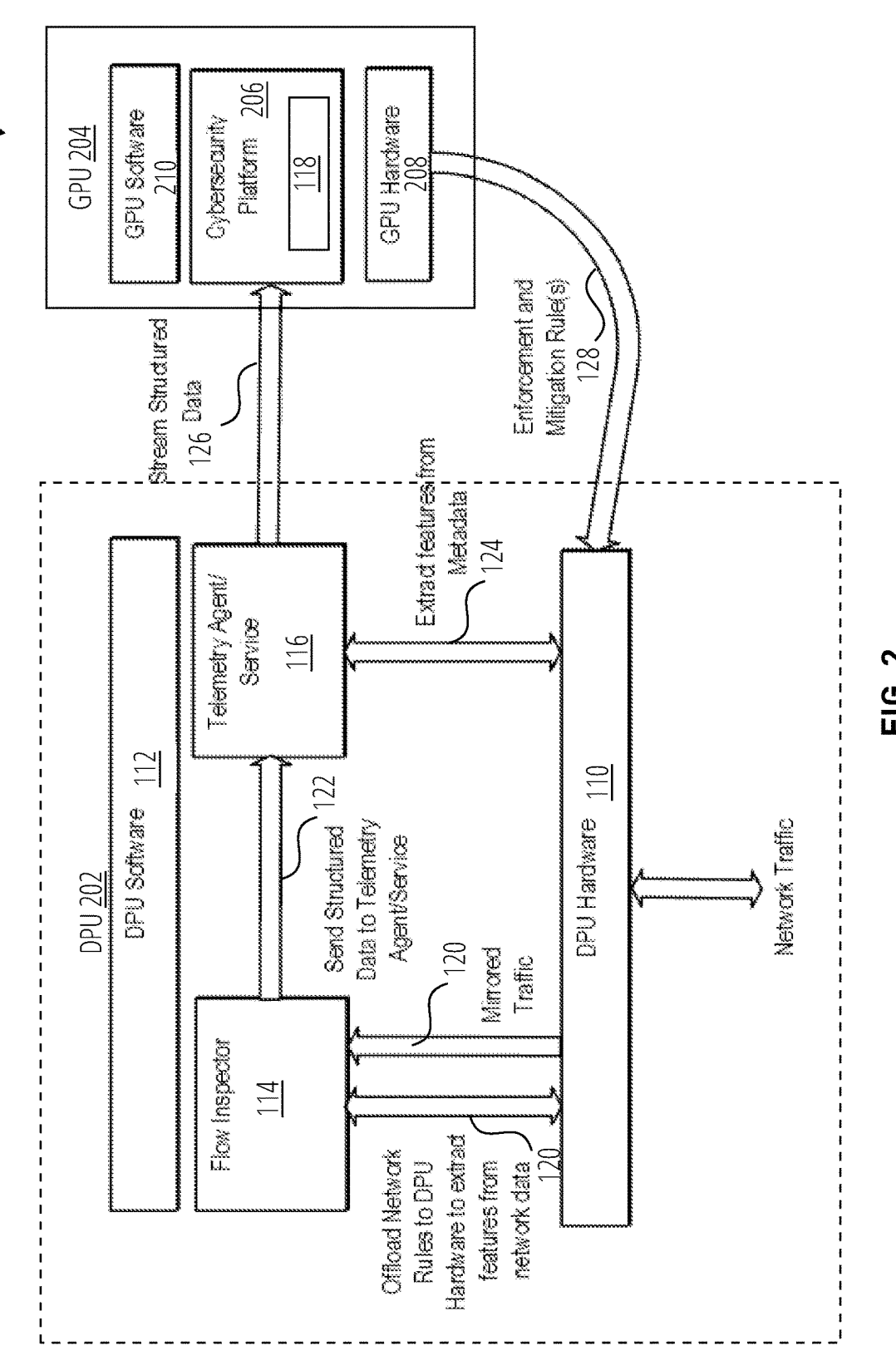
FIG. 2 is a block diagram of an example DPU-based system architecture, according to at least one embodiment.

In at least one embodiment, DPU 102 can include connectivity with packet-based interconnects (e.g., Ethernet), switched-fabric interconnects (e.g., InfiniBand, Fibre Channels, Omni-Path), or the like. In at least one embodiment, DPU 102 can provide a data center that is accelerated, fully programmable, and configured with security (e.g., zero-trust security) to prevent data breaches and cyberattacks. In at least one embodiment, DPU 102 can include a network adapter, an array of processor cores, and infrastructure offload engines with full software programmability. In at least one embodiment, DPU 102 can sit at an edge of a server to provide flexible, secured, high-performance cloud and AI workloads. In at least one embodiment, DPU 102 can reduce the total cost of ownership and increase data center efficiency. In at least one embodiment, DPU 102 can provide the software framework and acceleration libraries (e.g., NVIDIA DOCA™) that enable developers to rapidly create applications and services for DPU 102, such as security services, virtualization services, networking services, storage services, AI/ML services, and management services. In at least one embodiment, ML detection system 118 is implemented in the AI/ML services. In another embodiment, ML detection system 118 is implemented on one or more hardware accelerators or other components of the DPU hardware 110. In at least one embodiment, the software framework and acceleration libraries make it easy to leverage hardware accelerators of DPU 102 to provide data center performance, efficiency, and security. In at least one embodiment, the ML detection system 118 is implemented in a GPU coupled to the DPU 102, as illustrated in FIG. 2. The GPU can include one or more accelerated AI/ML pipelines described herein.

In at least one embodiment, DPU 102 can provide networking services with a virtual switch (vSwitch), a virtual router (vRouter), network address translation (NAT), load balancing, and network virtualization (NFV). In at least one embodiment, DPU 102 can provide storage services, including NVME™ over fabrics (NVMe-oF™) technology, elastic storage virtualization, hyper-converged infrastructure (HCI) encryption, data integrity, compression, data deduplication, or the like. NVM Express™ is an open logical device interface specification for accessing non-volatile storage media attached via the PCI Express® (PCIe) interface. NVMe-oF™ provides an efficient mapping of NVMe commands to several network transport protocols, enabling one computer (an "initiator") to access block-level storage devices attached to another computer (a "target") very efficiently and with minimum latency. The term "Fabric" is a generalization of the more specific ideas of network and input/output (I/O) channel. It essentially refers to an N:M interconnection of elements, often in a peripheral context. The NVMe-oF™ technology enables the transport of the NVMe command set over a variety of interconnection infrastructures, including networks (e.g., Internet Protocol (IP)/Ethernet) and also I/O Channels (e.g., Fibre Channel). In at least one embodiment, DPU 102 can provide hardware-accelerated security services using Next-Generation Firewall (NGFW), Intrusion Detection Systems (IDS), Intrusion Prevention System (IPS), a root of trust, micro-segmentation, distributed denial-of-service (DDoS) prevention technologies, and ML detection using data extraction logic 114 and ML detection system 118. NGFW is a network security device that provides capabilities beyond a stateful firewall, like application awareness and control, integrated intrusion prevention, and cloud-delivered threat intelligence. In at least one embodiment, the one or more network interfaces can include an Ethernet interface (single or dual ports) and an InfiniBand interface (single or dual ports). In at least one embodiment, the one or more host interfaces can include a PCIe interface and a PCIe switch. In at least one embodiment, the one or more host interfaces can include other memory interfaces. In at least one embodiment, the CPU can include multiple cores (e.g., up to 8 64-bit core pipelines) with L2 cache per two one or two cores and L3 cache with eviction policies support for double data rate (DDR) dual in-line memory module (DIMM) (e.g., DDR4 DIMM support), and a DDR4 DRAM controller. Memory can be on-board DDR4 memory with error correction code (ECC) error protection support. In at least one embodiment, the CPU can include a single core with L2 and L3 caches and a DRAM controller. In at least one embodiment, the one or more hardware accelerators can include a security accelerator, a storage accelerator, and a networking accelerator. In at least one embodiment, ML detection system 118 is hosted by the security accelerator. In at least one embodiment, the security accelerator can provide a secure boot with hardware root-of-trust, secure firmware updates, Cerberus compliance, Regular expression (RegEx) acceleration, IP security (IPsec)/Transport Layer Security (TLS) data-in-motion encryption, AES-GCM 128/256-bit key for data-at-rest encryption (e.g., Advanced Encryption Standard (AES) with ciphertext stealing (XTS) (e.g., AES-XTS 256/512), secure hash algorithm (SHA) 256-bit hardware acceleration, Hardware public key accelerator (e.g., Rivest-Shamir-Adleman (RSA), Diffie-Hellman, Digital Signature Algorithm (DSA), ECC, Elliptic Curve Cryptography Digital Signature Algorithm (EC-DSA), Elliptic-curve Diffie-Hellman (EC-DH)), and True random number generator (TRNG). In at least one embodiment, the storage accelerator can provide BlueField SNAP-NVMe™ and VirtIO-blk, NVMe-oF™ acceleration, compression and decompression acceleration, and data hashing and deduplication. In at least one embodiment, the network accelerator can provide remote direct memory access (RDMA) over Converged Ethernet (RoCE) ROCE, Zero Touch ROCE, Stateless offloads for TCP, IP, and User Datagram Protocol (UDP), Large Receive Offload (LRO), Large Segment Offload (LSO), checksum, Total Sum of Squares (TSS), Residual Sum of Squares (RSS), HTTP dynamic streaming (HDS), and virtual local area network (VLAN) insertion/stripping, single root I/O virtualization (SR-IOV), virtual Ethernet card (e.g., VirtIO-net), Multi-function per port, VMware NetQueue support, Virtualization hierarchies, and ingress and egress Quality of Service (QOS) levels (e.g., 1K ingress and egress QoS levels). In at least one embodiment, DPU 102 can also provide boot options, including secure boot (RSA authenticated), remote boot over Ethernet, remote boot over Internet Small Computer System Interface (iSCSI), Preboot execution environment (PXE), and Unified Extensible Firmware Interface (UEFI).

In at least one embodiment, DPU 102 can provide management services, including a 1GbE out-of-band management port, network controller sideband interface (NC-SI), Management Component Transport Protocol (MCTP) over System Management Bus (SMBus), and Monitoring Control Table (MCT) over PCIe, Platform Level Data Model (PLDM) for Monitor and Control, PLDM for Firmware Updates, Inter-Integrated Circuit (I2C) interface for device control and configuration, Serial Peripheral Interface (SPI) interface to flash, embedded multi-media card (eMMC) memory controller, Universal Asynchronous Receiver/Transmitter (UART), and Universal Serial Bus (USB).

In at least one embodiment, the hardware-accelerated security service is an adaptive cloud security service that provides real-time network visibility, detection, and response to cyber threats. In at least one embodiment, hardware-accelerated security service acts as the monitoring or telemetry agent for DPU 102 or a cybersecurity platform (e.g., FIG. 2), such as the NVIDIA Morpheus platform, which is an AI-enabled, cloud-native cybersecurity platform. The NVIDIA Morpheus platform is an open application framework that enables cybersecurity developers to create AI/ML pipelines for filtering, processing, and classifying large volumes of real-time data, allowing customers to continuously inspect network and server telemetry at scale. The NVIDIA Morpheus platform can provide information security to data centers, enabling dynamic protection, real-time telemetry, and adaptive defenses for detecting and remediating cybersecurity threats.

Previously, users, devices, data, and applications inside the data center were implicitly trusted, and perimeter security was sufficient to protect them from external threats. In at least one embodiment, DPU 102, using hardware-accelerated security service, can define the security perimeter with a zero-trust protection model that recognizes that everyone and everything inside and outside the network cannot be trusted. Hardware-accelerated security service can enable network screening with encryption, granular access controls, and micro-segmentation on every host and for all network traffic. Hardware-accelerated security service can provide isolation, deploying security agents in a trusted domain separate from the host domain. If a host device is compromised, this isolation by hardware-accelerated security service prevents the attacker from knowing about or accessing hardware-accelerated security service, helping to prevent the attack from spreading to other servers. In at least one embodiment, the hardware-accelerated security service described herein can provide host monitoring, enabling cybersecurity vendors to create accelerated intrusion detection system (IDS) solutions to identify an attack on any physical or virtual machine. Hardware-accelerated security service can feed data about application status to SIEM or SIEM & XDR system. Hardware-accelerated security services can also provide enhanced forensic investigations and incident response.

As described above, attackers attempt to exploit breaches in security control mechanisms to move laterally across data center networks to other servers and devices. Hardware-accelerated security service described herein can enable security teams to shield their application processes, continuously validate their integrity, and, in turn, detect malicious activity. If an attacker terminates the security control mechanism's processes, the hardware-accelerated security service described herein can mitigate the attack by isolating the compromised host device, preventing the malware from accessing confidential data or spreading to other resources.

Conventionally, security tools run in the same host domain as the malware. So, stealthy malware can employ hiding techniques from the host device, enabling the malware to silently take over and tamper with agents and operating system (OS). For example, if anti-virus software is running on a host device that needs to continue operating or is not suspended, the hardware-accelerated security service described herein actively monitors the process to determine any anomalies, malware, or intrusion as described in more detail in the various embodiments described below. The malware runs in the host domain, and the hardware-accelerated security service runs in a separate domain from the host domain.

The host device 104 may be a desktop computer, a laptop computer, a smartphone, a tablet computer, a server, or any suitable computing device capable of performing the techniques described herein. In some embodiments, the host device 104 may be a computing device of a cloud-computing platform. For example, the host device 104 may be a server machine of a cloud-computing platform or a component of the server machine. In such embodiments, the host device 104 may be coupled to one or more edge devices (not shown) via network 108. An edge device refers to a computing device that enables communication between computing devices at the boundary of two networks. For example, an edge device may be connected to host device 104, one or more data stores, one or more server machines via network 108, and may be connected to one or more endpoint devices (not shown) via another network. In such an example, the edge device can enable communication between the host device 104, one or more data stores, one or more server machines, and one or more client devices. In other or similar embodiments, host device 104 may be an edge device or a component of an edge device. For example, host device 104 may facilitate communication between one or more data stores, one or more server machines connected to host device 104 via network 108, and one or more client devices connected to host device 104 via another network.

In still other or similar embodiments, host device 104 can be an endpoint device or a component of an endpoint device. For example, host device 104 may be, or may be a component of, devices, such as televisions, smartphones, cellular telephones, data center servers, data DPUs, personal digital assistants (PDAs), portable media players, netbooks, laptop computers, electronic book readers, tablet computers, desktop computers, set-top boxes, gaming consoles, a computing device for autonomous vehicles, a surveillance device, and the like. In such embodiments, host device 104 may be connected to DPU 102 over one or more network interfaces via network 108. In other or similar embodiments, host device 104 may be connected to an edge device (not shown) via another network, and the edge device may be connected to DPU 102 via network 108.

In at least one embodiment, the host device 104 executes one or more computer programs. One or more computer programs can be any process, routine, or code executed by the host device 104, such as a host OS, an application, a guest OS of a virtual machine, or a guest application, such as executed in a container. Host device 104 can include one or more CPUs of one or more cores, one or more multi-core CPUs, one or more GPUs, one or more hardware accelerators, or the like.

In at least one embodiment, one or more computer programs reside in a first computing domain (e.g., a host domain), and hardware-accelerated security service and ML detection system 118 reside in a second computing domain (e.g., DPU domain or infrastructure domain) different than the first computing domain. In at least one embodiment, the malicious activity is caused by malware, and hardware-accelerated security service is out-of-band security software in a trusted domain that is different and isolated from the malware. That is, the malware may reside in a host domain, and hardware-accelerated security service, being in the trusted domain, can monitor the physical memory to detect the malware in the host domain. In at least one embodiment, DPU 102 includes a direct memory access (DMA) controller (not illustrated in FIG. 1) coupled to a host interface. The DMA controller can read the data from the host's physical memory via a host interface. In at least one embodiment, the DMA controller reads data from the host's physical memory using the PCIe technology. Alternatively, other technologies can be used to read data from the host's physical memory.

Although various embodiments described above are directed to embodiments where hardware-accelerated security service and ML detection system 118 are implemented in separate computing devices, including DPU 102 and accelerated AI/ML pipelines (e.g., on a GPU coupled to the DPU), in other embodiments, operations are performed on single DPU 102. In other embodiments, DPU 102 may be any computing system or computing device capable of performing the techniques described herein.

In at least one embodiment, the host device 104 resides in a first computing domain (e.g., a host domain), and hardware-accelerated security service and ML detection system 118 reside in a second computing domain (e.g., DPU domain) different than the first computing domain. In another embodiment, the host device 104 resides in a first computing domain (e.g., a host domain), hardware-accelerated security service resides in a second computing domain (e.g., DPU domain), and ML detection system 118 resides in a third computing domain different than the first and second computing domains.

Although FIG. 1 illustrates the ML detection system 118 as part of the DPU 102, in other embodiments, the ML detection system 118 can be implemented on a separate device, such as a GPU with an accelerated AI/ML pipeline, such as illustrated in FIG. 2. In this embodiment, the GPU (or accelerated AI/ML pipeline) is coupled to the DPU 102 and can host the ML detection system 118. In at least one embodiment, the ML detection system 118 is the NVIDIA MORPHEUS cybersecurity platform. The accelerated AI/ML pipeline can perform pre-processing operations, inferences, post-processing operations, actions, or any combination thereof. The accelerated AI/ML pipeline can be a combination of hardware and software, such as the NVIDIA EXG platform, and software for accelerating AI/ML operations on the NVIDIA EXG platform. For example, the accelerated AI/ML pipeline can provide advantages in accelerating processes up to 60 times compared to a CPU. The accelerated AI/ML pipeline can also provide an advantage of a number of inferences that can be done in parallel (e.g., up to millions of inferences in parallel). Additional details of ML detection system 118 are described below with respect to FIG. 6.

FIG. 2 is a block diagram of an example DPU-based system architecture 200, according to at least one embodiment. The DPU-based system architecture 200 is similar to DPU-based system architecture 100, as noted by similar reference numbers, except as set forth below. The DPU-based system architecture 200 includes a first integrated circuit, labeled DPU 202, and a second integrated circuit, labeled GPU 204. The GPU 204 can host a cybersecurity platform 206, such as an accelerated AI/ML pipeline, that hosts the ML detection system 118 remotely from the DPU 202. In at least one embodiment, the accelerated AI/ML pipeline can be part of the NVIDIA MORPHEUS cybersecurity platform. As described above, the NVIDIA Morpheus platform is an AI-enabled, cloud-native cybersecurity platform. The NVIDIA Morpheus platform is an open application framework that enables cybersecurity developers to create AI/ML pipelines for filtering, processing, and classifying large volumes of real-time data, allowing customers to continuously inspect network and server telemetry at scale. The NVIDIA Morpheus platform can provide information security to data centers to enable dynamic protection, real-time telemetry, and adaptive defenses for detecting and remediating cybersecurity threats. In at least one embodiment of FIG. 2, DPU 202 extracts the network data 120 and the metadata 124 from the DPU hardware 110 of the DPU 202 in a similar manner as described above with respect to FIG. 1. The network data 120 can be extracted from the network traffic received by the network interfaces of the DPU hardware 110. The metadata 124 can be extracted from registers, counters, or the like, of the DPU hardware 110.

In at least one embodiment, the DPU 202 includes a data extraction logic 114 (e.g., DOCA Flow Inspector) that extracts the network data 120 and a telemetry agent 116 that extracts the metadata 124 from the DPU hardware 110, as described above. The flow inspector can be configured by a configuration file that specifies what type of data should be extracted from the network data 120. The configuration file can specify one or more filters that extract for inclusion or remove from inclusion particular data from the network data 120. The flow inspector can generate a data structure 122 with the extracted data. The data structure 122 can be any type of data structure, such as a struct, an object, a message, or the like. For example, the configuration file can specify that all HTTP traffic be extracted from the network data 120. The flow inspector sends the structured data (e.g., data structure 122) to the telemetry agent 116. In at least one embodiment, the telemetry agent 116 can be programmed by a configuration file (same or different configuration file than the flow inspector) that specifies what metadata 124 should be extracted from the DPU hardware 110, such as from embedded counters, registers, or the like. For example, the configuration file can specify which values from counters, registers, or the like should be extracted by the telemetry agent 116 to be streamed with the extracted network data. In at least one embodiment, the telemetry agent 116 combines the metadata 124 with the structured data (e.g., data structure 122) into the stream data 126 (e.g., streamed structured data). Instead of sending the stream data 126 to a locally-hosted ML detection system 118, as described above with respect to FIG. 1, the telemetry agent 116 can send the stream data 126 to the GPU 204 with the cybersecurity platform 206. In this embodiment, the cybersecurity platform 206 includes one or more accelerated AI/ML pipelines deployed on GPU hardware 208. The cybersecurity platform 206 can implement the ML detection system 118.

In at least one embodiment, the DPU hardware 110 includes a data buffer to store the network data 120. In at least one embodiment, the DPU hardware 110 creates a copy of the network data 120 so that it can be filtered by the flow inspector to extract the structured data.

In at least one embodiment, a computing system includes the DPU 202 and GPU 204. The DPU 202 has DPU hardware 110, including a network interface, a host interface, a CPU, and an acceleration hardware engine. The DPU 202 can implement a hardware-accelerated security service with the flow inspector and telemetry agent to collect and stream feature data to the cybersecurity platform 206 to protect a host device from a DDOS attack. As described herein, the hardware-accelerated security service extracts a set of features from first data in network traffic received on the network interface and second data stored in registers in the DPU hardware 110. The hardware-accelerated security service (flow inspector and telemetry agent) can combine the first feature data and the second feature data into the set of features. The GPU 204, or other accelerated pipeline hardware, is coupled to the DPU 102. The GPU 204 has GPU software 210, the cybersecurity platform 206 hosting the ML detection system 118, and GPU hardware 208. The GPU 204 determines, using the ML detection system 118, whether the host device is subject to a DDOS attack based on the set of features. The GPU 204 sends an enforcement rule 128 to the DPU 202 (e.g., DPU hardware 110) responsive to a determination that the host device is subject to a DDOS attack. The DPU 102 can perform an action, associated with the enforcement rule 128, on subsequent network traffic directed to the host device.

In at least one embodiment, the first feature data includes a source media access control (MAC) address (src_mac), a destination MAC address (dst_mac), a source IP address (src_ip), a destination IP address (dst_ip), a source port (src_port), a destination port (dst_port), a protocol identifier, a packet size (packet_size), a maximum packet size (max_packet_size), or the like. The second feature data can include one or more flags, one or more counts, or the like. The one or more flags and counts can be stored in registers or counters of the DPU hardware 110.

In at least one embodiment, the host device resides in a first computing domain, and the DPU software 112 resides in a second computing domain different from the first computing domain. The ML detection system 118 can reside in the second computing domain (FIG. 1) or a third computing domain (FIG. 2) different from the first computing domain and the second computing domain.

Figure 3:
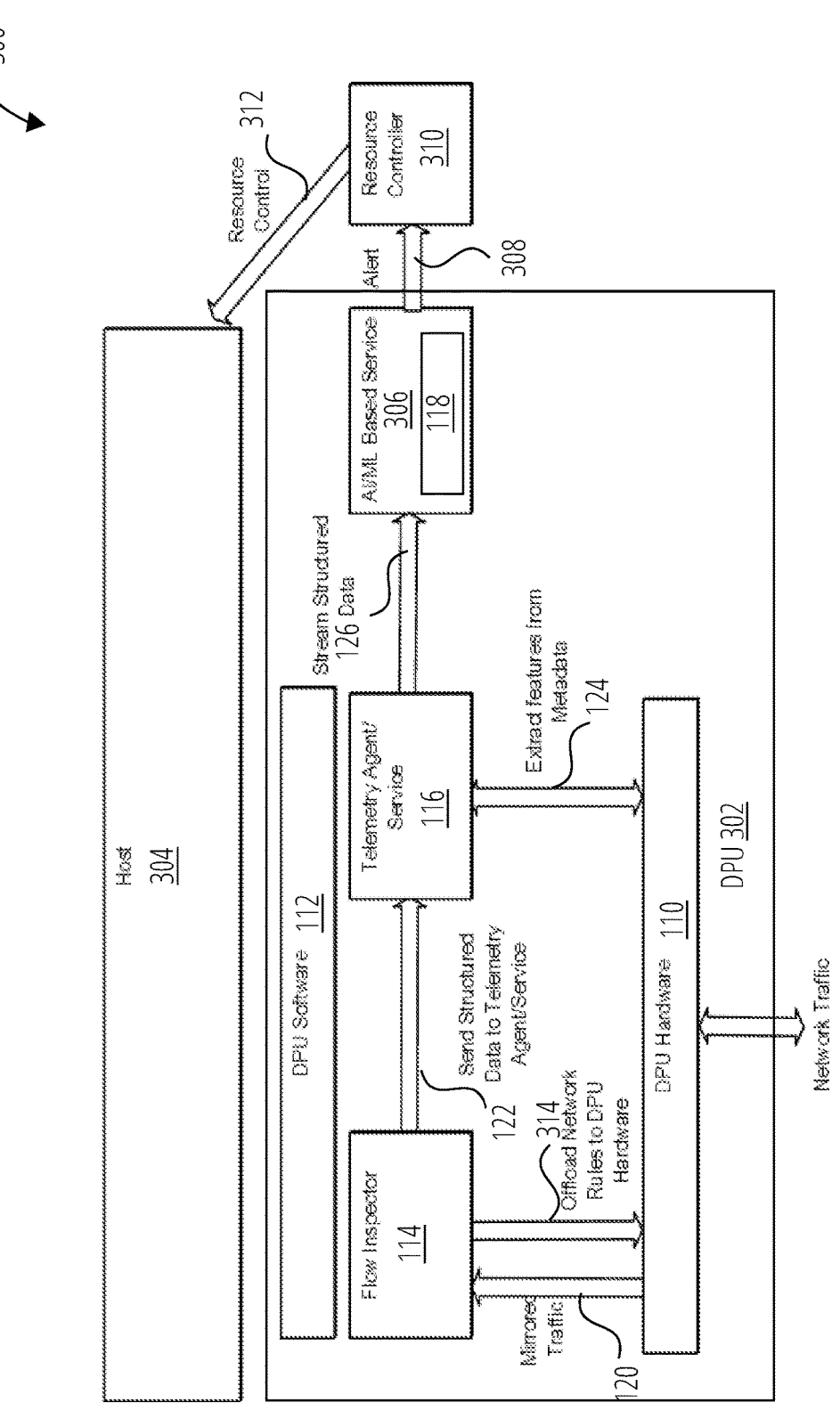
FIG. 3 is a block diagram of an example DPU-based system architecture, according to at least one embodiment.

FIG. 3 is a block diagram of an example DPU-based system architecture 300, according to at least one embodiment. The DPU-based system architecture 300 is similar to DPU-based system architecture 100, as noted by similar reference numbers, except as set forth below. The DPU-based system architecture 300 includes a first integrated circuit, labeled DPU 302. The DPU 302 includes similar hardware and software components as the DPU 102 as described above, except the DPU 302 includes an AI/ML-based service 306 that implements the ML detection system 118 locally on the DPU 302. The AI/ML-based service 306 can receive the stream data 126 from the telemetry agent 116, as described above. The AI/ML-based service 306 can determine, using the ML detection system 118, whether a host device 304 is subject to a DDOS attack. Responsive to determining that the host device 304 is subject to a DDOS attack, the AI/ML-based service 306 can send an alert 308 to a resource controller 310. The resource controller 310 can be a provisioning server that provisions resources of or for the host device 304. The resource controller 310 can be implemented on a separate device, such as the DPU 302 and the host device 304. The resource controller 310 can send resource control information 312 to the host device 304 in response to the alert 308. Alternatively, the alert 308 can be an indication of the DDOS attack, and the resource controller 310 can perform one or more operations to prevent any damage or other negative effects from the detected DDOS attack in response to the indication from the ML detection system 118.

In at least one embodiment, the data extraction logic 114 can receive mirrored network traffic data (e.g., network data 120) from the DPU hardware 110 (e.g., acceleration hardware engine). The data extraction logic 114 can offload and filter the mirrored network traffic data based on predefined filters 314 using the DPU hardware 110 (e.g., acceleration hardware engine) to obtain filtered network traffic. The processing logic generates the first feature data from the filtered network traffic. The processing logic extracts the second feature data by extracting telemetry data from the registers of the DPU hardware 110 (e.g., acceleration hardware engine). In at least one embodiment, the telemetry agent 116 generates the second feature data from the telemetry data and combines the first feature data and the second feature data into a set of features. The telemetry agent 116 sends the set of features to the DPU hardware 110 (e.g., accelerated pipeline hardware).

In at least one embodiment, the DPU 302 provides an AI/ML-based DDOS detection and mitigation solution. The solution is a combination of three main components: 1. The DPU hardware-based accelerated DOCA Flow inspector service (e.g., data extraction logic 114) to filter, classify and monitor traffic, build data structure according to configuration, and send them to DOCA Telemetry Service (e.g., telemetry agent 116); 2. The DOCA Telemetry Service (e.g., telemetry agent 116) can query DPU counters in the DPU hardware 110 and send them along with the data from Flow Inspector to locally or remotely hosted AI/ML-based application(s) of the AI/ML-based service 306. 3. The AI/ML-based service 306 can detect a DDOS attack based on pre-trained AI/ML model(s) using advanced AI/ML algorithms. Once a DDOS attack is detected, the AI/ML-based service 306 can send network mitigation rules to DPU hardware 110. This solution provides full End-to-End DDOS detection based on AI/ML on the DPU for DDOS edge protection.

In at least one embodiment, a configuration to Flow Inspector can be added for the traffic patterns to be monitored. For each traffic pattern, the relevant fields can be configured for extraction and sent to the DOCA Telemetry Service. The DOCA Telemetry Service can query DPU counters, aggregate the information from Flow Inspector, and send it to AI/ML application(s). 3. The AI/ML application(s) can receive the data and decide, using advanced AI/ML algorithms, whether this is an actual DDOS attack. 4. The AI/ML application(s) can mitigate the attack by adding hardware-based network rule(s) to the DPU hardware 110.

Although various embodiments described above with respect to FIG. 1 to FIG. 10 are directed to solutions using a DPU, other embodiments can be implemented in other devices, such as a switch or a network interface card, such as illustrated and described below with respect to FIG. 11 to FIG. 12.

Figure 4:
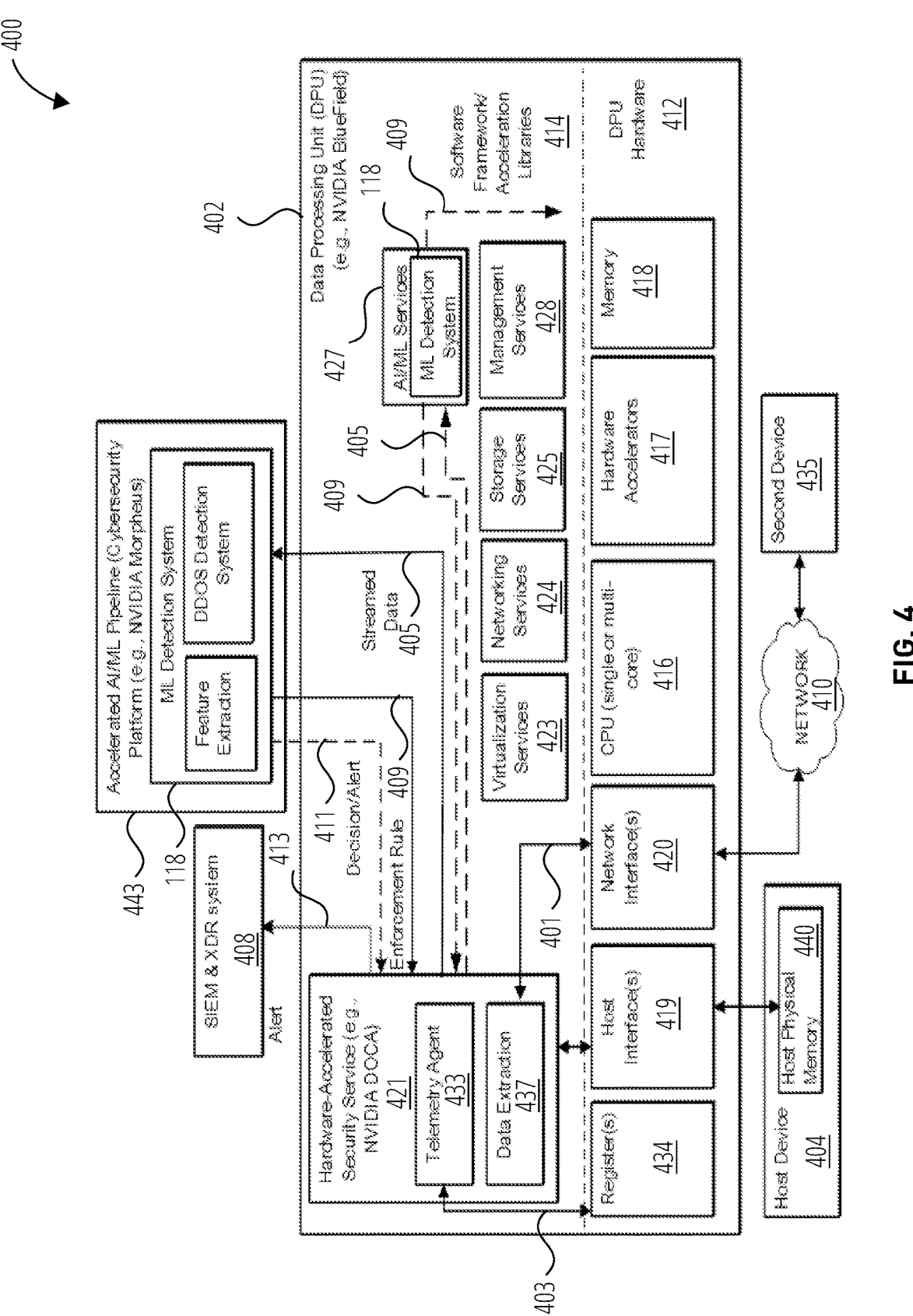
FIG. 4 is a block diagram of an example DPU-based system architecture, according to at least one embodiment.

FIG. 4 is a block diagram of an example DPU-based system architecture 400, according to at least one embodiment. The DPU-based system architecture 400 (also referred to as "system" or "computing system" herein) includes an integrated circuit, labeled DPU 402, a host device 404, a SIEM or XDR system 408. The DPU-based system architecture 400 can be part of a data center and include one or more data stores, one or more server machines, and other components of data center infrastructure. In implementations, network 410 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In at least one embodiment, DPU 402 is integrated as a SoC that is considered a data center infrastructure on a chip. In at least one embodiment, DPU 402 includes DPU hardware 412 and software framework with acceleration libraries 414. The DPU hardware 412 can include a CPU 416 (e.g., a single-core or multi-core CPU), one or more hardware accelerators 417, memory 418, one or more host interfaces 419, and one or more network interfaces 420. The software framework and acceleration libraries 414 can include one or more hardware-accelerated services, including hardware-accelerated security service 421 (e.g., NVIDIA DOCA), hardware-accelerated virtualization services 423, hardware-accelerated networking services 424, hardware-accelerated storage services 425, hardware-accelerated artificial intelligence/machine learning (AI/ML) 427, and hardware-accelerated management services 428. In at least one embodiment, DPU 402 is coupled to an accelerated AI/ML pipeline 443. In at least one embodiment, the accelerated AI/ML pipeline 443 can be a GPU coupled to the DPU 402. In at least one embodiment, the accelerated AI/ML pipeline 443 can host an ML detection system 118 that includes one or more ML detection models trained to determine whether a host device 404 is subject to a DDOS attack. In at least one embodiment, the accelerated AI/ML pipeline 443 is the NVIDIA MORPHEUS cybersecurity platform. Accelerated AI/ML pipeline 443 can perform pre-processing operations, inferences, post-processing operations, actions, or any combination thereof. Accelerated AI/ML pipeline 443 can be a combination of hardware and software, such as the NVIDIA EXG platform and software for accelerating AI/ML operations on the NVIDIA EXG platform. For example, accelerated AI/ML pipeline 443 can provide advantages in accelerating processes up to 60 times compared to a CPU. Accelerated AI/ML pipeline 443 can also provide an advantage of a number of inferences that can be done in parallel (e.g., up to millions of inferences in parallel). Additional details of ML detection system 118 are described below with respect to FIG. 6. The host device 404 can include host physical memory 440. The host physical memory 440 can include one or more volatile and/or non-volatile memory devices that are configured to store the data of host device 404. In at least one embodiment, the ML detection system 118 includes a DDOS detection system 130, and other detection systems, such as a network-anomaly detection system, a ransomware detection system, a malicious URL detection system, a DGA detection system, and optionally other malware detection systems.

In at least one embodiment, hardware-accelerated security service 421 includes data extraction logic 437 (e.g., DOCA Flow Inspector) that extracts network data 401 from network traffic received over the network 410 via one or more network interface(s) 420. The network data 401 can be received over network 410 from a second device 435. The second device 435 can be the initiator of the malicious DDOS attack. In at least one embodiment, the hardware-accelerated security service 421 receives a copy of the network data 401 (e.g., a mirrored copy of the network data 401 directed to the host device 404). The data extraction logic 437 can be configured by a configuration file that specifies what type of data should be extracted from the network data 401. The configuration file can specify one or more filters that extract for inclusion or remove from inclusion specified types of data from the network data 401. Since the network data can be a copy, the network traffic that does not meet the filtering criteria can be discarded or removed. The network traffic that meets the filtering criteria can be structured and streamed to the cybersecurity platform for analysis. The data extraction logic 437 can generate a data structure with the extracted data. The data structure can be any type of data structure, such as a struct, an object, a message, or the like. For example, the configuration file can specify that all HyperText Transport Protocol (HTTP) traffic be extracted from the network data 401. The configuration file can specify that all traffic on port 80, port 443, and/or port 22 should be extracted from the network data 401 for analysis. A large percentage of attacks target these three ports: SSH-22/TCP, HTTPS-443/TCP, and HTTP-80/TCP.

In at least one embodiment, hardware-accelerated security service 421 includes a telemetry agent 433 that extracts metadata 403 from one or more registers 434 of the DPU hardware 412. In at least one embodiment, the telemetry agent 433 can be configured or programmed by a configuration file (same or different configuration file than the data extraction logic 437) that specifies what metadata should be extracted from the DPU's hardware, such as from embedded counters, registers, or the like. For example, the configuration file can specify which values from counters, registers, or the like, should be extracted by the telemetry agent to be streamed with the extracted network data. Some metadata 403 can be associated or related to the network data 401. Some metadata 403 can be associated or related to the underlying hardware and not related to the network traffic. In at least one embodiment, the telemetry agent 433 can also send the data structure with the extracted network data 401 and extracted metadata 403 to the cybersecurity platform (e.g., accelerated AI/ML pipeline(s) 443).

In at least one embodiment, the telemetry agent 433 combines the extracted network data 401 and the metadata 403 into streamed data 405. The telemetry agent 433 sends the streamed data 405 to the ML detection system 118 to determine whether the host device 404 is subject to the DDOS attack. Responsive to a determination by the ML detection system 118 that the host device 404 is subject to the DDOS attack, the ML detection system 118 sends an enforcement rule 409 to the DPU 402. The hardware-accelerated security service 421 can perform an action, associated with the enforcement rule 409, on subsequent network traffic directed to the host device 404 from the second device 435. In at least one embodiment, the ML detection system 118 can output an indication 411 of classification by ML detection system 118. Indication 411 can be an indication of a DDOS attack (or other network anomalies) on the host device 404. In at least one embodiment, ML detection system 118 can send indication 411 (e.g., decision/ alert) to hardware-accelerated security service 421, and hardware-accelerated security service 421 can send an alert 413 to SIEM or SIEM & XDR system 408. Alert 413 can include information about the DDOS attack. In at least one embodiment, ML detection system 118 can send an indication to SIEM or SIEM & XDR system 408, in addition to or instead of sending indication 411 to hardware-accelerated security service 421.

In at least one embodiment, data extraction logic 437 has feature extraction logic to extract one or more features and send the extracted features to ML detection system 118 instead of the extracted data. For example, data extraction logic 437 can extract HTTP data, and the telemetry agent 433 can extract corresponding metadata 403 from the DPU hardware registers and counters. The data extraction logic
437 can generate the streamed data 405 and send it to the ML
detection system 118. In another embodiment, the ML
detection system 118 includes feature extraction logic to
extract a set of features from the streamed data 405. The
streamed data can be raw extracted data from the hardware-
accelerated security service 421. In at least one embodiment,
extracted features are input into a DDOS detection system
130. In at least one embodiment, the DDOS detection
system 130 includes a tree-based model trained to determine
whether the host device 404 is subject to a DDOS attack.

In another embodiment, as illustrated in FIG. 4, the ML
detection system 118 can be hosted locally in the AI/ML
services 427. In this embodiment, the hardware-accelerated
security service 421 can send the streamed data 405 to the
AI/ML services 427. The ML detection system 118 of the
AI/ML services 427 can determine whether the host device
404 is subject to a DDOS attack. Responsive to detecting the
DDOS attack, the AI/ML services 427 can send an enforce-
ment rule 409 to the hardware-accelerated security service
421. Alternatively, the AI/ML services 427 can send the
enforcement rule 409 to the DPU hardware 412.

Figure 5:
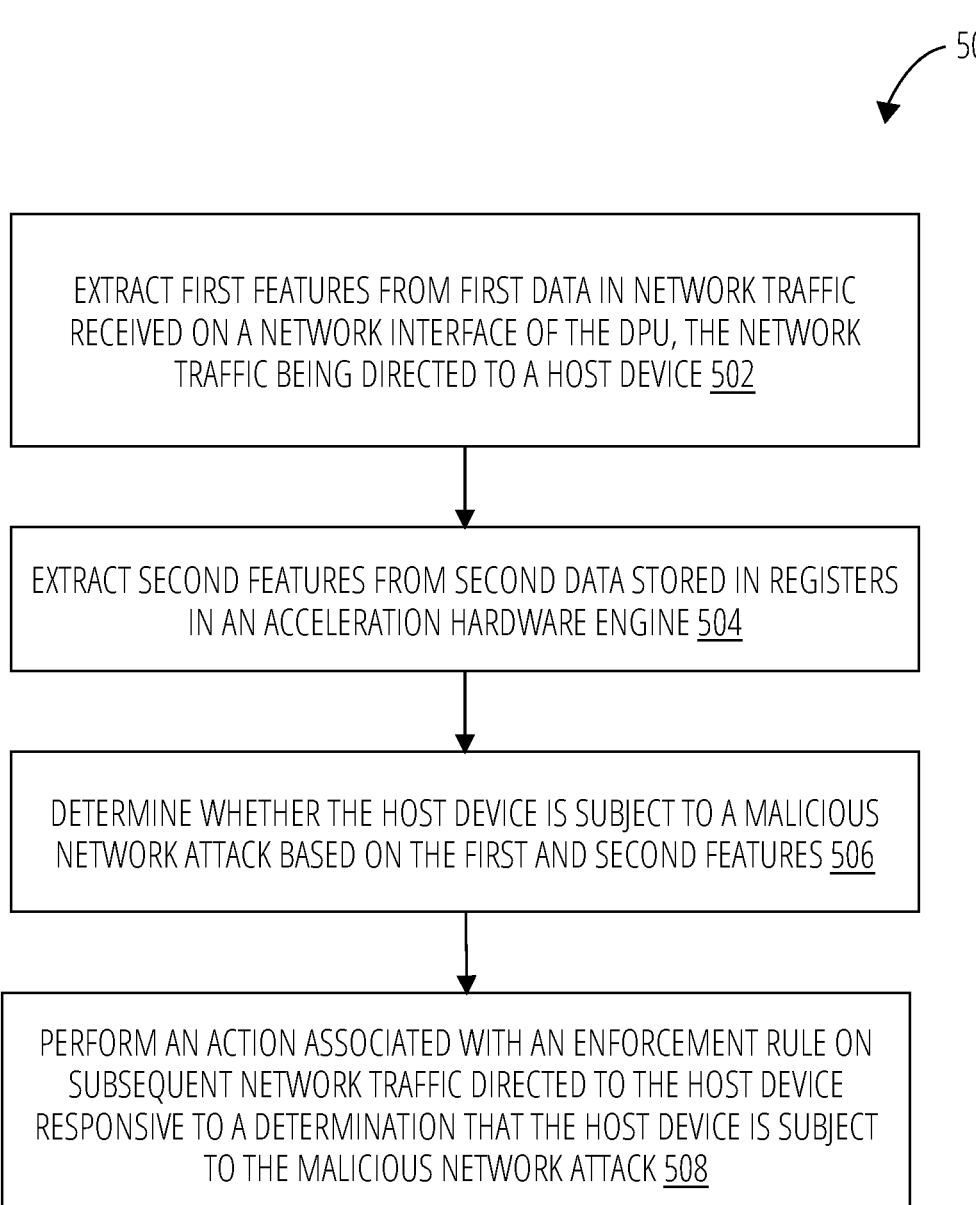
FIG. 5 is a flow diagram of an example method of detecting a DDOS attack on a host device, according to at least one embodiment.

FIG. 5 is a flow diagram of an example method 500 of
detecting a DDOS attack on a host device, according to at
least one embodiment. The processing logic can be a com-
bination of hardware, firmware, software, or any combina-
tion thereof. In at least one embodiment, method 500 may be
performed by processing logic of DPU 102 of FIG. 1. In at
least one embodiment, method 500 may be performed by
processing logic of DPU 202 and GPU 204 of FIG. 2. In at
least one embodiment, method 500 may be performed by
processing logic of DPU 302 of FIG. 3. In at least one
embodiment, method 500 may be performed by processing
logic of DPU 402 and accelerated AI/ML pipeline 443 of
FIG. 4. Method 500 may be performed by one or more data
processing units (e.g., DPUs, CPUs, and/or GPUs), includ-
ing (or communicating with) one or more memory devices.
In at least one embodiment, method 500 may be performed
by multiple processing threads, each thread executing one or
more individual functions, routines, subroutines, or opera-
tions of the method. In at least one embodiment, processing
threads implementing method 500 may be synchronized
(e.g., using semaphores, critical sections, and/or other thread
synchronization logic). Alternatively, processing threads
implementing method 500 may be executed asynchronously
with respect to each other. Various operations of method 500
may be performed differently than the order shown in FIG.
5. Some operations of the methods may be performed
concurrently with other operations. In at least one embodi-
ment, one or more operations shown in FIG. 5 may not
always be performed.

Referring to FIG. 5, the processing logic extracts first
features from first data in network traffic received on a
network interface (block 502). The first data is network data
directed to a host device. The processing logic extracts
second features from second data stored in registers in an
acceleration hardware engine (block 504). The processing
logic uses an ML detection system to determine whether the
host device is subject to a DDOS attack based on the first and
second features (block 506). The processing logic performs
an action associated with an enforcement rule on subsequent
network traffic directed to the host device from the second
device, responsive to a determination that the host device is
subject to the DDOS attack (block 508).

In at least one embodiment, the processing logic extracts
first feature data from the network traffic and second feature
data from the registers in the acceleration hardware engine.

The processing logic combines the first feature data and the
second feature data into a set of features. The processing
logic sends the set of features to an accelerated pipeline
hardware. The accelerated pipeline hardware hosts the ML
detection system. The processing logic receives the enforce-
ment rule from the accelerated pipeline hardware responsive
to a determination by the accelerated pipeline hardware that
the host device is subject to a DDOS attack based on the set
of features.

In at least one embodiment, the host device resides in a
first computing domain, and the DPU and the ML detection
system reside in a second computing domain different from
the first computing domain. In at least one embodiment, the
host device resides in a first computing domain, the DPU
resides in a second computing domain different from the first
computing domain, and the ML detection system resides in
a third computing domain different from the first computing
domain and the second computing domain.

DDOS DETECTION

As described above, one type of malicious activity is
caused by DDOS attacks, such as through network traffic on
specified ports. In at least one embodiment, hardware-
accelerated security service and the cybersecurity platform
are part of an active system for detecting DDOS attacks on
a host device by constantly monitoring the network traffic
for anomalies by leveraging accelerated hardware for feature
extraction from the network traffic and accelerated hardware
for anomaly detection. The hardware-accelerated security
service can extract specific types of network data and
metadata from the underlying acceleration hardware and
stream this information to a GPU for ML-based anomaly
detection. The hardware-accelerated security service allows
live-network analysis (or real-time data analysis) of the
network traffic and provides mitigation or enforcement to
stop the network traffic that is classified as malicious imme-
diately. In at least one embodiment, a DPU can process a
copy of the network data, extract features or indications
from network data, and extract features from the DPU
hardware itself before sending it to an ML detection system
on accelerated hardware, such as a GPU coupled to the DPU.
The DPU can collect real-time data using out-of-band fil-
tering using the hardware-accelerated security service. The
DPU can integrate a DDOS detection system with the
real-time data collected by hardware-accelerated security
service to detect a DDOS attack in the network traffic and
immediately take enforcement, mitigation, or remedial
actions in response. In another embodiment, the DPU can
host the ML detection system that detects a DDOS attack in
the network traffic.

As described herein, the ML detection system can include
different types of detection systems, including a DDOS
detection system (e.g., DDOS detection system 130 of FIG.
1), a ransomware detection system, or the like. An example
of the DDOS detection system is illustrated and described
below with respect to FIG. 6.

Figure 6:
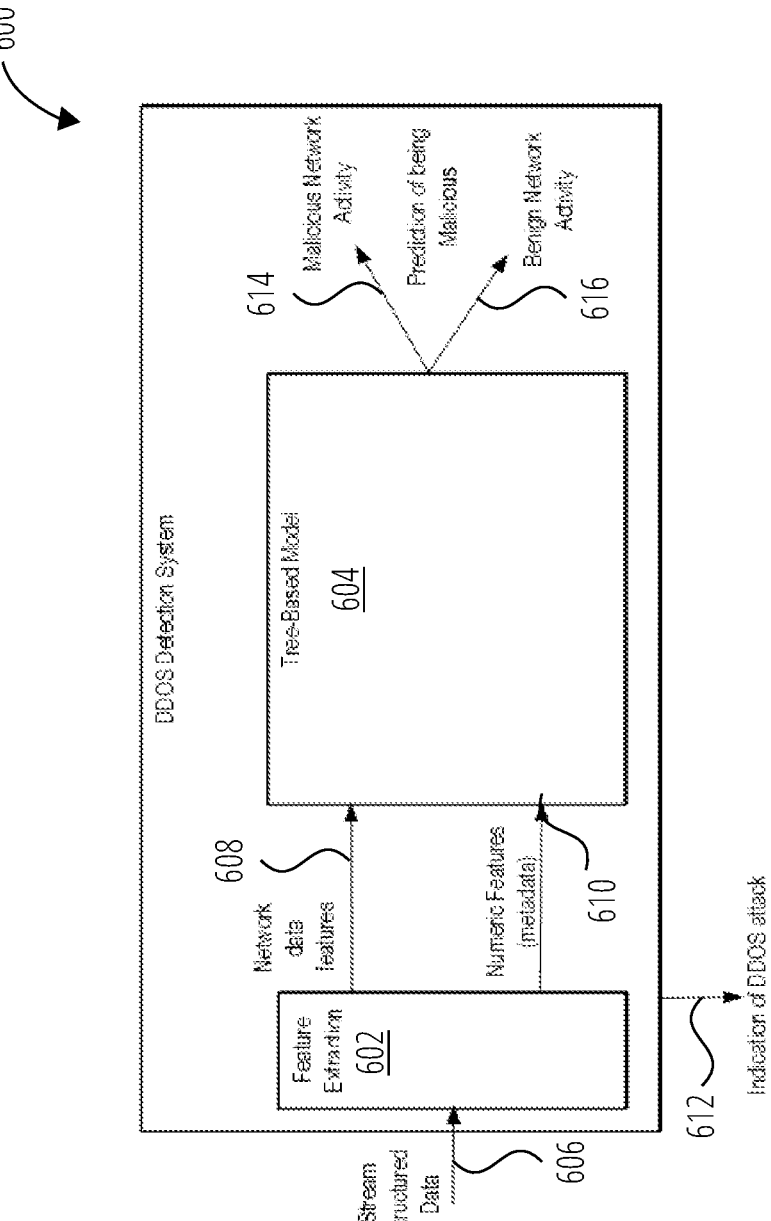
FIG. 6 is a block diagram of an example DDOS detection system, according to at least one embodiment.

FIG. 6 is a block diagram of an example DDOS detection
system 600, according to at least one embodiment. The
DDOS detection system 600 includes feature extraction
logic 602 and a tree-based model 604 trained to determine
whether a host device is subject to a DDOS attack using a
set of features. Feature extraction logic 602 receives
streamed structured data 606 and extracts first feature data
608 from the streamed structured data 606 and second
feature data 610 (e.g., numeric features of the metadata)
from registers in the acceleration hardware engine. In at least one embodiment, the feature extraction logic 602 can create an input vector with the first feature data 608 and the second feature data 610. The tree-based model 604 can receive the input vector and provide a decision on whether the host device is subject to a DDOS attack based on the input vector. The DDOS detection system 600 can output an indication of the DDOS attack 612 responsive to a determination that the host device is subject to the DDOS attack.

The tree-based model 604 can be either a classification model or a regression model, depending on the task it is designed to solve and the type of output it produces. The tree-based model 604 can be used as a classification model when the task is to predict a categorical or discrete output. The model builds a decision tree where each internal node represents a decision based on a feature, and each leaf node corresponds to a class label. The final output is the class label of the leaf node that the input data point reaches. Examples of these types of tree-based models are decision trees, random forest, Gradient Boosting Machines (GBM), XGBoost, LightGBM, or the like. The tree-based model 604 can also be used as a regression model when the task is to predict a continuous output. In this case, the model builds a decision tree where each internal node represents a decision based on a feature, and each leaf node corresponds to a numeric value. Examples of these types of tree-based models are Decision Trees for regression, Random Forest for regression, GBM for regression, XGBoost, LightGBM, or the like.

A tree-based regression model is a type of supervised machine learning algorithm used for predicting continuous or numeric values. It builds a decision tree data structure to make predictions based on input features. The process starts with the entire dataset, which consists of input features (also known as independent variables) and corresponding continuous target values (the dependent variable). The algorithm looks for the feature that best splits the data into two subsets, aiming to minimize the variance or mean squared error (MSE) of the target values within each subset. The data is then partitioned into two child nodes based on this split. This splitting process is repeated recursively for each child node, creating more nodes and branches in the tree. At each step, the algorithm identifies the best feature to split on and continues this process until a stopping criterion is met. The stopping criterion can be the maximum depth of the tree, a minimum number of samples required to split a node, or other measures to prevent overfitting. Once the tree is constructed, each leaf node (terminal node) contains a subset of the data. The target values within each leaf node are aggregated, usually by calculating the mean or median, to determine the final prediction for that region of the input feature space. When given a new input data point, the algorithm follows the decision tree from the root node to a leaf node based on the values of the input features. The prediction for the new data point is the value stored in the leaf node reached during traversal. Decision trees are easy to interpret and understand. The decision-making process can be visualized, making it easier to explain the model's predictions. Trees can capture non-linear relationships between features and the target variable. Tree-based models are relatively robust to outliers as they split the data into regions, reducing the impact of individual data points. To improve performance and mitigate some of the disadvantages, ensemble methods like Random Forest and Gradient Boosting Machines (GBM) are often used, which combine multiple decision trees to make more accurate predictions.

Figures 7A, 7B:
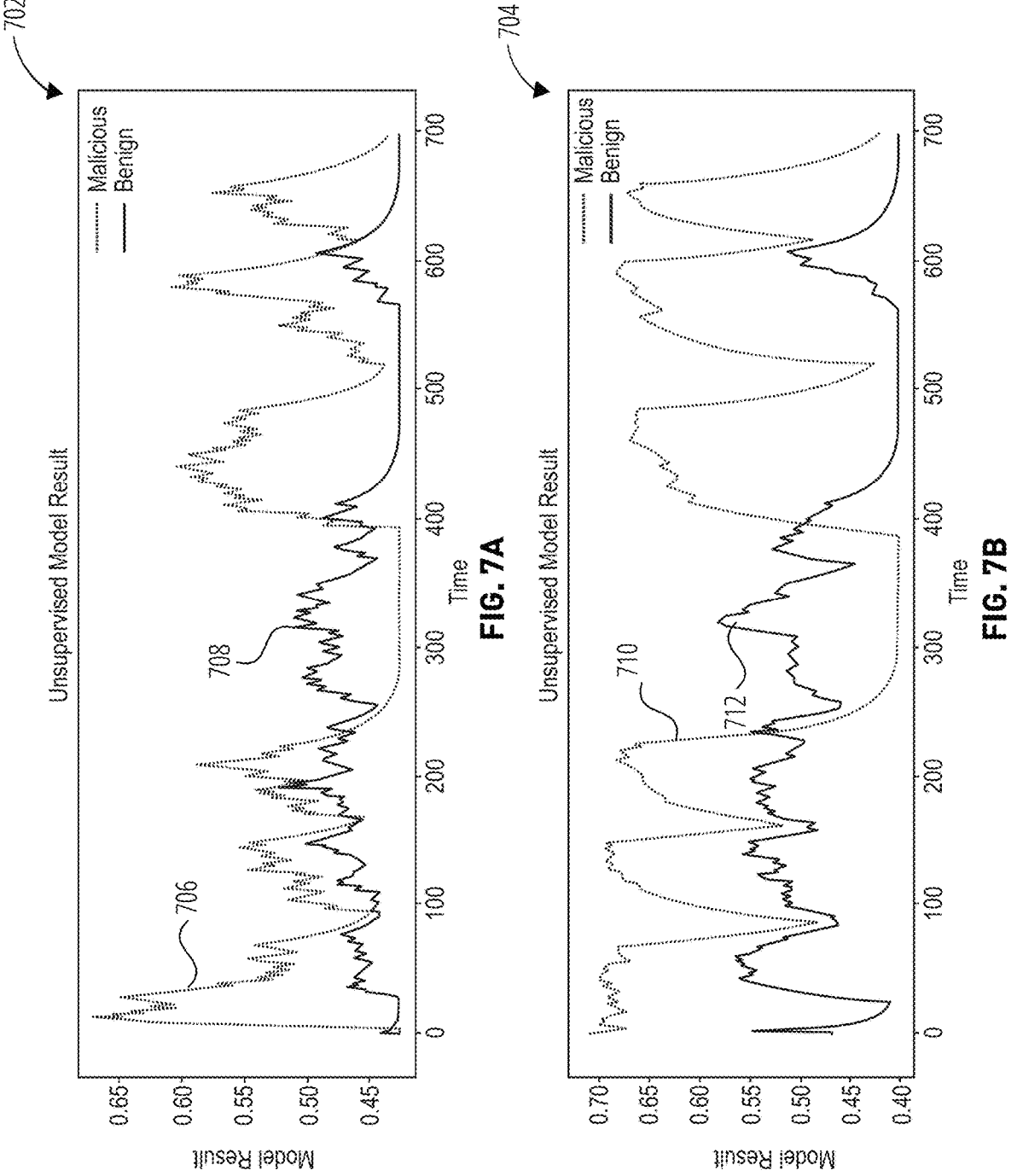
FIG. 7A is a graph showing unsupervised model results of the tree-based model of FIG. 6 according to at least one embodiment.
FIG. 7B is a graph showing unsupervised model results of the tree-based model of FIG. 6 according to at least one embodiment.

In at least one embodiment, the tree-based model 604 is trained to differentiate the network data (and metadata) as malicious network activity 614 and benign network activity 616. In at least one embodiment, the tree-based model 604 can determine a level of confidence that the network activity corresponds to a malicious class or a benign class. The level of confidence can be a prediction percentage of being malicious. For example, if the level of confidence satisfies a level of confidence criterion (e.g., a confidence threshold), the tree-based model 604 can classify the network activity as malicious network activity 614. In at least one embodiment, the DDOS detection system 600 can output the indication of the DDOS attack 612 responsive to the network activity being classified as malicious network activity 614. The indication of the DDOS attack 612 can specify the confidence level that the network activity corresponds to the malicious class. Alternatively, the DDOS detection system 600 can output an indication of a benign network activity responsive to the network activity being classified as benign network activity 616. The indication of benign network activity can indicate a level of confidence that the network activity is benign. In other embodiments, the tree-based model 604 can output model results for malicious network activity 614 or benign network activity 616 as a prediction percentage, such as illustrated in FIG. 7A and FIG. 7B.

In other embodiments, other types of AI/ML models can be used to determine whether the host device is subject to a DDOS attack based on the first feature data 608 and the second feature data 610. In some cases, the AI/ML models can receive only the first feature data 608 and determine whether the host device is subject to a DDOS attack. In other embodiments, additional feature data can be used to determine or predict whether the host device is subject to a DDOS attack.

As described above, ML detection models, such as the tree-based model 604, can be deployed in DDOS detection system 600 residing in a GPU, a DPU, an accelerated AI/ML pipeline, or other hardware-related hardware, as described above. In another embodiment, the hardware-accelerated security service 421 and DDOS detection system 600 can reside on a convergence card that includes both DPU hardware and GPU hardware. The convergence card can be a single integrated circuit with the DPU and GPU hardware. In another embodiment, the convergence card can include multiple integrated circuits to implement the functionality of the DPU and the GPU, as described herein.

In at least one embodiment, the hardware-accelerated security service can extract first feature data 608 and second feature data 610 and use a publisher subscribe feature (e.g., Kafka publisher) to make the first feature data 608 and second feature data 610 available to the DDOS detection system 600.

In various embodiments, the data extraction and the data analysis are done by accelerated hardware. The accelerated hardware can be used to extract feature data from the network traffic, and accelerated hardware can be used to perform ML-based anomaly detection, as described herein. The accelerated hardware can also provide enforcement rules in response to detecting anomalies to protect the host device from malicious network activity, including a DDOS attack. The accelerated hardware can structure the data in any format the cybersecurity platform can receive. The structure can be a message, a struct, or the like. The feature data may not necessarily be formatted in a common format or be serialized to send to the cybersecurity platform. In other embodiments, the accelerated hardware can use a common format or serialize the data to send to the cyber-security platform.

FIG. 7A is a graph 702 showing unsupervised model results of the tree-based model of FIG. 6 according to at least one embodiment. The graph 702 shows a signal of malicious network activity 706 and a signal of benign network activity 708 output from the tree-based model 604 of FIG. 6 over time.

FIG. 7B is a graph 704 showing unsupervised model results of the tree-based model of FIG. 6 according to at least one embodiment. The graph 704 shows a signal of malicious network activity 710 and a signal of benign network activity 712 output from the tree-based model 604 of FIG. 6 over time.

Figure 8:
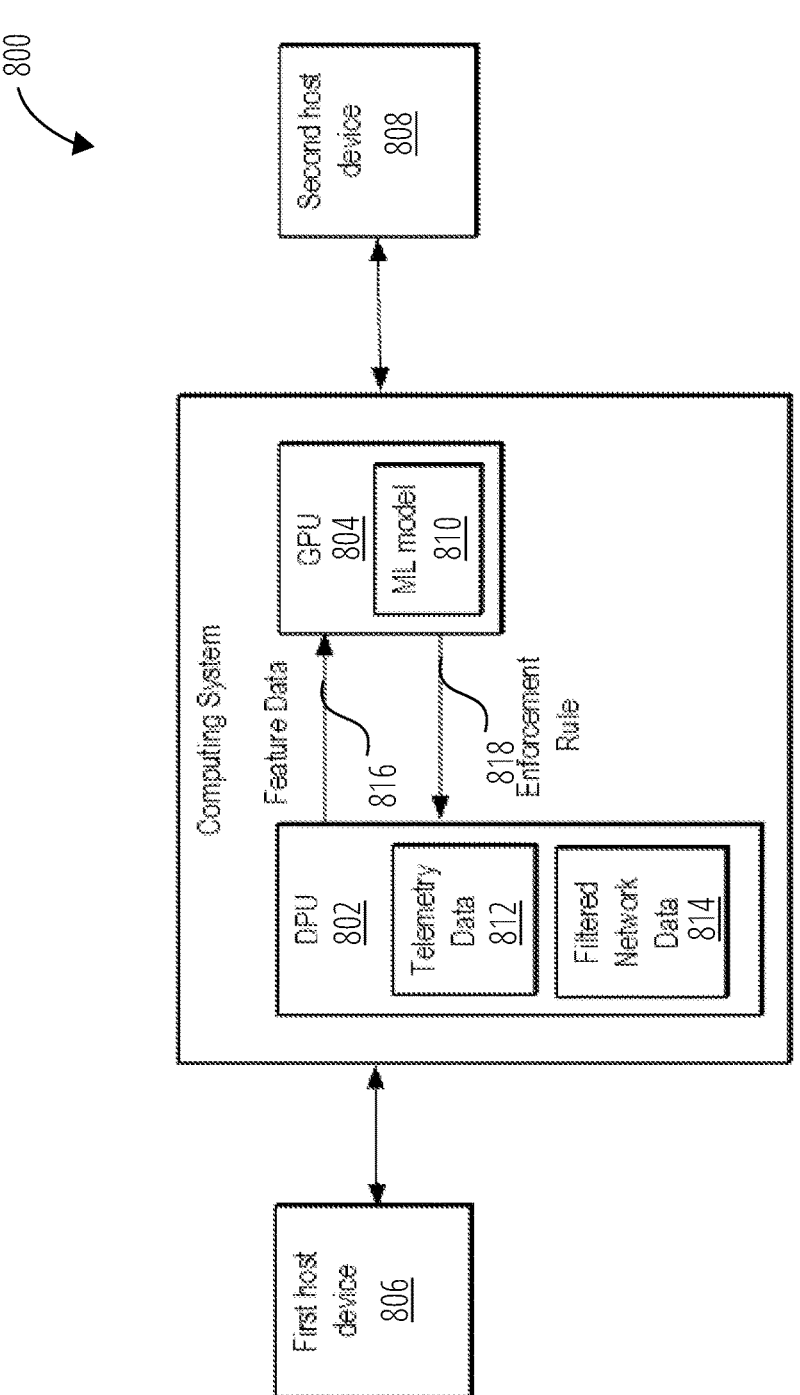
FIG. 8 is a block diagram of a computing system with a DPU and a GPU coupled between a first host device and a second host device, according to at least one embodiment.

FIG. 8 is a block diagram of a computing system 800 with a DPU 802 and a GPU 804 coupled between a first host device 806 and a second host device 808, according to at least one embodiment. In at least one embodiment, the computing system 800 and the first host device 806 reside in a data center, and the second host device 808 is a malicious host attempting to attack the first host device 806. In at least one embodiment, the GPU 804 includes an ML model 810 that identifies potentially malicious network activity of a DDOS attack between the first host device 806 and the second host device 808. The computing system 800 can be a networking device, an infrastructure device, or the like that performs a networking function, such as the functions performed by hubs, repeaters, switches, routers, bridges, gateways, modems, or network interfaces. Examples of network devices can include, but are not limited to, access points, routers, Wi-Fi® access points, Wi-Fi® routers, switches, hubs, bridges, modems, DPUs, SmartNICs, active cables, or the like. In at least one embodiment, the computing system 800 operates on one or more layers of the open systems interconnection ("OSI") model. For example, the computing system 800 may, in some cases, correspond to a hub that connects computing devices operating at level one of the OSI model. In another embodiment, computing system 800 is a bridge or switch that processes traffic at OSI layer two. In another embodiment, computing system 800 is a router operating at OSI layer three. In some embodiments, computing system 800 operates at multiple OSI levels.

In at least one embodiment, the operation of computing system 800 at a layer of the OSI model comprises performing networking functions related to that layer and collecting telemetry data 812 pertinent to the performance of those functions. This telemetry data 812 can comprise metrics, log data, or other information that describes events, states, or operations associated with the computing system 800 and the performance of a relevant function. Note that in at least some cases and embodiments, the computing system 800 that operates on a particular layer of the OSI model may collect telemetry data 812 relevant to its operation on that layer more efficiently than devices that operate on other layers. In addition to collecting telemetry data 812, the DPU 802 collects and filters network traffic to obtain filtered network data 814. The filtered network data 814 can be HTTP traffic, such as network data on a specified port. The filtered network data 814 and the telemetry data 812 can be combined and sent as feature data 816 to the GPU 804 for DDOS detection. The GPU 804 uses the ML model 810 to identify the network traffic as malicious, i.e., a DDOS attack, using the feature data 816. In response to identifying a DDOS attack, the GPU 804 sends an enforcement rule 818 to the DPU 802 to protect the first host device 806 from the malicious network traffic of the DDOS attack by the second host device 808.

In at least one embodiment, the computing system 800 collects and processes telemetry data 812 and filtered network data 814, which are collected on-the-fly by the computing system 800. For example, such data may be collected by an application-specific integrated circuit ("ASIC") that performs the device's networking function. The telemetry data 812 can, using this technique, be rapidly read from the device's registers or other internal memory. Examples of telemetry data can include, but are not limited to, latency histograms, receive counters, send counters, metrics associated with encapsulation or de-encapsulation, queue occupancy, queue length, and power-level usage indicators. Note that in some cases, attempts to utilize a device to perform crypto-currency mining, malicious, or other undesired usage patterns may result in increased power consumption by the computing system 800.

In at least one embodiment, computing system 800 comprises a networking component, the ML model 810, and a database. The networking component can include circuitry and other computing facilities, such as processors, memory, and processor-executable instructions used to perform one or more network-related functions of the computing system 800, such as sending or receiving data. This networking function may comprise sending or receiving data between the first host device 806 and the second host device 808. In at least one embodiment, the second host device 808 is considered a source host, and the first host device 806 can be considered a destination host. A source host may be a device, such as a computing device that transmits data over a network. Similarly, a destination host may be a device, such as a computing device that receives data sent over the network.

In at least one embodiment, the ML model 810 can analyze network traffic and identify undesired data or network traffic patterns. The ML model 810 can implement one or more of a variety of machine learning methods, techniques, and algorithms. These can include, but are not limited to, supervised learning, unsupervised learning, deep learning, and reinforcement learning. Embodiments of an ML model 810 may, for example, implement algorithms for regression, clustering, instance-based algorithms, regularization algorithms, artificial neural networks, convolutional neural networks, recurrent neural networks, long short-term memory networks, decision-trees, deep belief networks, gradient boosting, XGBoost, support vector machines, Bayesian techniques, random forests, and so forth. It will be appreciated that these examples are intended to be illustrative. As such, they should not be construed in a manner that would limit potential embodiments to only those that incorporate the specific examples provided.

In at least one embodiment, the ML model 810 is trained to identify an undesired usage of computing system 800. Such usage can include using computing system 800 in a manner that causes or facilitates harm, such as harm to the operation of a computer or computer network, harmful disclosure of information, harmful transmission of data, etc. In at least one embodiment, the ML model 810 is trained to identify harmful usage of computing system 800 using a dataset of examples. These examples can include network telemetry, network data packets, series of network data packets, or other information. In at least one embodiment, these examples are labeled to indicate whether or not a particular example is associated with undesired data or traffic patterns. As appropriate to the machine learning model, various techniques may use labeled or unlabeled data to train the model.

In at least one embodiment, the computing system 800 includes a database that can maintain information related to ML model 810. For example, the database can maintain datasets, as just described, that are used to train, retrain, or refine the training of an ML model 810. For example, in at least one embodiment, a set of example data patterns indicative of malicious, unauthorized, or otherwise undesired network traffic patterns, is maintained in the database. This data may be updated or supplemented as new attack patterns are discovered. Therefore, the computing system 800 may include circuitry, processor-executable instructions, or other computing facilities for receiving updated data and storing the data in the database.

In at least one embodiment, computing system 800 includes circuitry, processor-executable instructions, or other computing facilities for training, retraining, or refinement of the ML model 810 using such updated data from the database. For example, after a new attack pattern is discovered, the database may be updated in response to a request from an external source, such as a command from a device that performs an administrative function. After the update, the computing system 800 initiates a training procedure, using the data stored in the database, to train, retrain, or refine the training of ML model 810. The ML model 810 may then have improved capabilities to detect network patterns that reflect characteristics similar to those of the new attack pattern or those that reflect characteristics similar to other, previously known patterns associated with undesired network usage.

In at least one embodiment, the database is omitted from the computing system 800. In some embodiments, an external database is used, and training samples are transmitted to the computing system 800 and used by the computing system 800 to train, retrain, or refine training of ML model 810. In other embodiments, training, retraining, or refinement of ML model 810 is performed externally, and an ML model 810 is updated to reflect the new training. For example, in at least one embodiment, a set of weights or other parameters, such as the weights or parameters used in an artificial neural network, are transmitted to computing system 800 and used to update corresponding weights or parameters in ML model 810.

In at least one embodiment, computing system 800 operates on one or more selected layers of the OSI model, collects data pertinent to networking operations performed on one or more selected layers, and analyzes the data using an ML model 810 to identify a suspicious or unauthorized network traffic pattern. For example, an ML model 810 might infer, based on analyzing data from the OSI layers, that an observed network traffic pattern appears to be a DDOS attack or other malicious use of computing system 800. The computing system 800 can then initiate a response to the detected network traffic pattern. By performing analysis on computing system 800, data pertinent to a particular OSI layer might be analyzed and an undesired use of the computing system 800 can be detected more quickly or more efficiently than might be the case if the analysis were performed remotely. This approach may also, in some embodiments, convey an advantage by permitting analysis of data at a particular OSI layer to be analyzed without requiring transmission of that data to another device or otherwise facilitating more rapid analysis of and response to the data.

Figure 9:
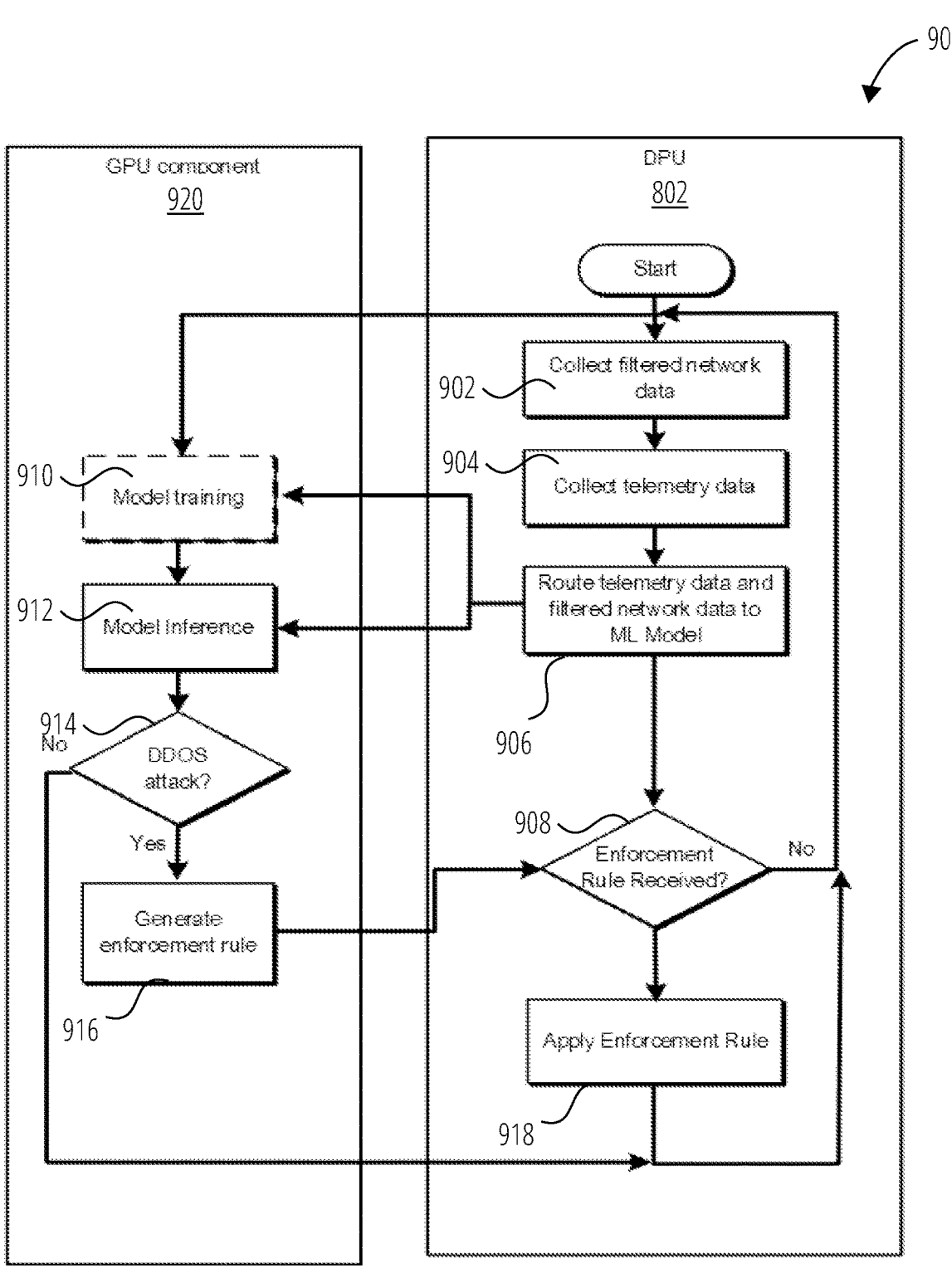
FIG. 9 illustrates a process flow for DDOS attack detection by a machine learning model, according to at least one embodiment.

FIG. 9 illustrates an example process flow 900 for DDOS attack detection by a machine learning model, according to at least one embodiment. In the example process flow 900, the DPU 802 of FIG. 8 can perform various operations, and a GPU component 920 can perform various operations. The GPU component 920 can be part of a host device. At block 902, the DPU 802 collects filtered network data as described above. The filtered network data can be collected by the hardware-accelerated security service as described above, such as a flow inspector. At block 904, the DPU 802 collects telemetry data associated with networking operations performed by the DPU 802. In at least one embodiment, telemetry data is collected by a telemetry agent. This filtered network data and telemetry data is then, in at least one embodiment, routed at block 906 to a machine learning model on the GPU component 804. In at least one embodiment, the filtered network data and the telemetry data are used to perform training of the machine learning model at block 910. This can include retraining or refining a trained model or training a new or additional machine learning model. In at least one embodiment, filtered network data and the telemetry data collected at blocks 902 and 904 are used to perform, at block 912, inference or other analysis consistent with the type of model used to identify a potentially DDOS attack as manifest in undesired traffic patterns. At block 914, if the DDOS attack is detected, the GPU component 804 generates an enforcement rule at block 918 to prevent the network traffic for the given DDOS attack. The enforcement rule is routed at block 918 to the DPU 802. The enforcement rule can include a mitigating action, a preventative action, a remedial action, or the like. The enforcement rule can be used to prevent the traffic from interfering with the operation of the DPU 802 or a host device to which the DDOS attack is directed. For example, in at least one embodiment, the machine learning model at block 914 identifies an undesired usage of the DPU 802 and may further be used to identify the usage characteristics, such as the network ports associated with the undesired usage. The DPU 802 can determine if the enforcement rule is received from the GPU component 804 at block 908. If the enforcement rule is received at block 908, the DPU 802 can apply the enforcement rule to prevent a DDOS attack (block 918). The DPU 802 can perform one or more actions to mitigate, prevent, or remediate the DDOS attack. Examples of potential enforcement actions can include, but are not necessarily limited to, sending a notification describing the inference, restricting usage of the network device, shutting down the network device, slowing the network device, applying restrictive measures to traffic associated with a network traffic pattern, and so on. It will be appreciated that these examples are intended to be illustrative rather than limiting. If an enforcement rule is not received at block 908, the DPU 802 can continue to collect filtered network data at block 902.

After a determination is made, information about the determination is fed, in at least one embodiment, back to model training at block 910. This can include information indicating whether or not a network traffic pattern (or other data or condition) that was classified as undesired by the machine learning model is confirmed as undesired or not being undesired. This information can then be used in model training at block 910 to refine the model's understanding of potentially malicious or otherwise undesired network traffic patterns and approve the model's ability to recognize and distinguish undesired behavior from behavior that conforms to an intended usage of the DPU 802.

In the embodiment of FIG. 9, the model training at block 910 and the model inference at block 912 are both performed on a GPU component of a host device. The GPU component is local to the host device since it runs the model inference at block 912. In another embodiment, the model training at block 910 can be performed offline, such as in a central ML platform over an ML data repository. The model training at block 910 can be performed in a development cycle, and the GPU component 920, which is local to the host, performs the model inference at block 912 to detect anomalies. In another embodiment, the model training at block 910 can be a scheduled re-training performed remotely, such as in the ML platform, on recent data collected to the centralized ML data repository. The model can be updated regularly on each host's GPU component. This can be an automated or partially automated update procedure. In this embodiment, the model inference at block 912 is performed locally to the host. In another embodiment, the model training at block 910 can execute locally on every host (for example, fine-tuning a general model originally trained remotely, such as in a centralized ML platform). The locally trained model at block 910 can be used by the host's GPU component 920, as illustrated in FIG. 9.

FIG. 10 is a flow diagram of a method of determining whether a host device is subject to a DDOS attack in accordance with one embodiment. The processing logic can be a combination of hardware, firmware, software, or any combination thereof. In at least one embodiment, method 1000 may be performed by processing logic of DPU 102 of FIG. 1. In at least one embodiment, method 1000 may be performed by processing logic of DPU 202 and GPU 204 of FIG. 2. In at least one embodiment, method 1000 may be performed by processing logic of DPU 302 of FIG. 3. In at least one embodiment, method 1000 may be performed by processing logic of DPU 402 and 443 of FIG. 4. Method 1000 may be performed by one or more data processing units (e.g., DPUs, CPUs, and/or GPUs), including (or communicating with) one or more memory devices. In at least one embodiment, method 500 may be performed by multiple processing threads, each thread executing one or more individual functions, routines, subroutines, or operations of the method. In at least one embodiment, processing threads implementing method 1000 may be synchronized (e.g., using semaphores, critical sections, and/or other thread synchronization logic). Alternatively, processing threads implementing method 1000 may be executed asynchronously with respect to each other. Various operations of method 1000 may be performed differently than the order shown in FIG. 10. Some operations of the methods may be performed concurrently with other operations. In at least one embodiment, one or more operations shown in FIG. 10 may not always be performed.

Referring to FIG. 10, the processing logic begins with the processing logic (e.g., DPU coupled to a host device) extracting a plurality of features from first data in network traffic data received on a network interface of the DPU and second data stored in registers in an acceleration hardware engine of the DPU, the first data being directed to the host device from a second device (block 1002). At block 1004, the processing logic determines, using a machine learning (ML) detection system, whether the host device is subject to a distributed denial of service (DDOS) attack based on the plurality of features. At block 1006, the processing logic performs, by the DPU, an action associated with an enforcement rule on subsequent network traffic data directed to the host device from the second device, responsive to a determination that the host device is subject to the DDOS attack.

In a further embodiment, the processing logic extracts first feature data from the network traffic data and second feature data from the registers in the acceleration hardware engine. The processing logic combines the first feature data and the second feature data into the plurality of features. The processing logic sends the plurality of features to accelerated pipeline hardware, which hosts the ML detection system. The processing logic receives the enforcement rule from the accelerated pipeline hardware responsive to a determination by the accelerated pipeline hardware that the host device is subject to the DDOS attack based on the plurality of features.

In at least one embodiment, the processing logic extracts first feature data from the network traffic data without extracting the second feature data from the registers in the acceleration hardware engine. The processing logic sends the first feature data to the accelerated pipeline hardware, which hosts the ML detection system. The processing logic receives the enforcement rule from the accelerated pipeline hardware responsive to a determination by the accelerated pipeline hardware that the host device is subject to the DDOS attack based on the first feature data.

In at least one embodiment, the processing logic extracts the first feature data by receiving mirrored network traffic data from the acceleration hardware engine. The processing logic offloads and filters the mirrored network traffic data based on predefined filters using the acceleration hardware engine to obtain filtered network traffic. The processing logic generates the first feature data from the filtered network traffic. The processing logic extracts the second feature data by extracting telemetry data from the registers of the acceleration hardware engine.

In at least one embodiment, the processing logic generates the second feature data from the telemetry data and combines the first feature data and the second feature data into the plurality of features. The processing logic sends the plurality of features to the accelerated pipeline hardware.

Although various embodiments described above with respect to FIG. 1 to FIG. 10 are directed to DPU-based solutions, other embodiments can be implemented in switch-based solutions, such as illustrated and described below with respect to FIG. 11 to FIG. 12. That is, in at least one embodiment, the collection and/or detection of DDOS attacks can be done on a switch or other network interface devices.

SWITCH-BASED SYSTEM ARCHITECTURES

Figure 11:
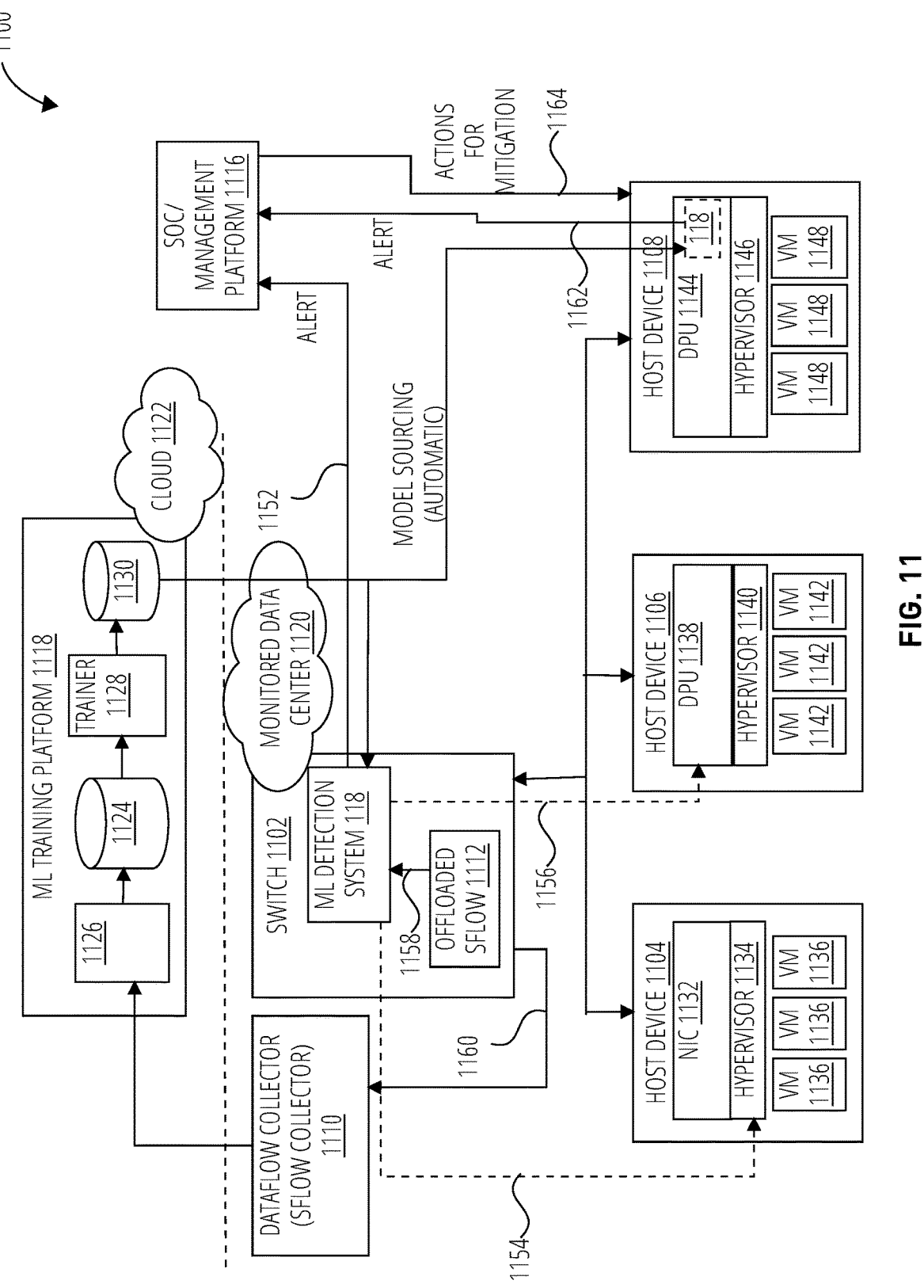
FIG. 11 is a block diagram of an example switch-based system architecture according to at least one embodiment.

FIG. 11 is a block diagram of an example switch-based system architecture 1100 according to at least one embodiment. The switch-based system architecture 1100 (also referred to as "system" or "computing system" herein) includes a switch 1102, a host device 1104, a host device 1106, and a host device 1108 in a monitored data center 1120. The switch 1102, also referred to as a "network switch," is a network device that connects multiple devices within a local area network (LAN) (or virtual LANs (VLANs), allowing them to communicate with each other by forwarding data packets based on their destination media access control (MAC) addresses. VLANs can be configured on network switches to segment and isolate network traffic for different purposes, such as separating production and development environments. In data center environments, network switches provide high-speed, low-latency connectivity between servers, storage devices, and other networking equipment. In larger data center architectures, aggregation switches and core switches might be used to connect multiple racks of servers and provide connectivity to external networks.

Although the monitored data center 1120 is shown as having three host devices 1104-1108, the monitored data center 1120 can include more or fewer host devices. The three host devices 1104-1108 are shown for three different scenarios where the switch 1102 can be used as part of an attack detection framework, as described in more detail below. The switch 1102 can be a top-of-rack (TOR) switch commonly used in data center environments. The switch 1102 can connect servers and networking equipment within a rack and provide high-speed and low-latency connectivity. The switch 1102 can include a CPU, memory, port interfaces, and switching fabric. The switching fabric is responsible for forwarding data packets between different ports. The switching fabric can be made up of specialized integrated circuits and components that manage the data flow. The port interfaces are physical interfaces where devices, such as servers, storage devices, or other switches connect to the switch 1102. The port interfaces can include Ethernet ports, fiber-optic connections, copper connections, or the like. The CPU and memory handle management tasks, control plane operations, and handle routing and switching protocols. The switch 1102 can execute software components, such as an operating system, switching and routing protocols (e.g., networking protocols such as Ethernet switching, IP routing, VLAN management, or the like), management interfaces (e.g., command line interfaces (CLI), web interfaces, or application programming interfaces (APIs) that allow network administrators to set up VLANs, configure ports, and monitor network performance), security features (access control lists (ACLs), port security, authentication, or the like), monitoring and reporting, and firmware.

A management platform 1116 can be associated with the monitored data center 1120. The management platform 1116 can be used to coordinate and configure various components of the attack detection framework. In at least one embodiment, the management platform 1116 is a cybersecurity platform. The switch-based system architecture 1100 can be part of the monitored data center 1120 and can include one or more data stores, one or more server machines, and other components of data center infrastructure. In this embodiment, the switch 1102 can be coupled to the host devices 1104-1108 over a network. The network can be a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

As described above, the attack detection framework based on a switch can be relevant when there are endpoints that do not possess a DPU, the endpoint device can't stream data at scale, or an attack detector (e.g., ML detection system) cannot be implemented on an endpoint device. The network traffic at a switch, in particular TOR switches, is similar to network traffic as seen by a DPU. Thus, the techniques described above for collecting, filtering, and processing network data to determine whether a host is subject to a DDOS attack can be applied in the switch 1102 or between a DPU and the switch 1102. In some cases, the relevant data used for DDOS attack detection is not encrypted. In other cases, there can be full encryption since the detection is based on timing features only.

As illustrated in FIG. 11, the switch 1102 can include network monitoring logic 1112 (e.g., offloaded sFlow technology) that can monitor and analyze network traffic in real time. The network monitoring logic 1112 can provide a way to collect data about network traffic flows, which include information about the source and destination of traffic, the protocols being used, and other relevant metrics. The network monitoring logic 1112 can provide collected data 1158 (e.g., flow data) to an ML detection system 118 hosted on the switch 1102. The network monitoring logic 1112 can provide collected data 1160 to a dataflow collector 1110 (e.g., sFlow collector) when training ML models of the ML detection system 118, as described in more detail below. The network monitoring logic 1112 can use the sFlow technology, the NetFlow technology, or the like. The sFlow technology is commonly used to gain insights into network performance, troubleshoot issues, and enhance security by detecting anomalous or suspicious activities. It works by sampling a portion of network packets passthrough through a network device (e.g., switch 1102 or a router). These sampled packets can be used to represent the behavior of the overall network traffic. The network monitoring logic 1112 can generate flow records that include information about the sampled packets, such as source and destination IP addresses, source and destination ports, protocol type, and packet counters. These flow records provide a summarized view of network traffic. The dataflow collector 1110 can be a sFlow collector, which is a software or hardware component that receives, processes, and stores sFlow data collected from various network devices. The primary purpose of a sFlow collector is to analyze network traffic flows, monitor network behavior, and provide insights into network performance, usage patterns, and security events.

In at least one embodiment, the network monitoring logic 1112 can collect and filter network data in a similar manner as the data extraction logic 114 (e.g., DOCA Flow Inspector) described above. The network monitoring logic 1112 can extract feature data from network traffic received at the switch 1102 from a second device (or multiple devices). The second device can be a device external to the monitored data center 1120. The second device can be a device within the monitored data center 1120. The second device can be the initiator of a DDOS attack. In at least one embodiment, the network monitoring logic 1112 can be configured by a configuration file that specifies what type of data should be extracted from the network data. The configuration file can specify one or more filters that extract for inclusion or remove from inclusion specified types of data from the network data. The network traffic that meets the filtering criteria can be structured and streamed to the ML detection system 118 for analysis. In at least one embodiment, the network monitoring logic 1112 can generate a data structure with the extracted data. The data structure can be any type of data structure, such as a struct, an object, a message, or the like. For example, the configuration file can specify that all HTTP traffic be extracted from the network data. The configuration file can specify that all traffic on port 80, port 443, and/or port 22 should be extracted from the network data for analysis. A large percentage of attacks target these three ports: SSH-22/TCP, HTTPS-443/TCP, and HTTP-80/TCP. The collected data can be sent or streamed to the ML detection system 118. The ML detection system 118 includes one or more ML detection models trained to determine whether a host device is subject to a DDOS attack based on the features data extracted by the network monitoring logic 1112. In response to a determination of a DDOS attack, the ML detection system 118 can send an alert 1152 to the management platform 1116. If the host device 1104 is subject to the DDOS attack, the ML detection system 118 can send an alert 1154 to the host device 1104.

In at least one embodiment, the host device 1104 includes a network interface card (NIC) 1132, a hypervisor 1134, and multiple virtual machines (VMs) 1136. In this embodiment, the ML training platform 1118 can send the alert 1154 to the hypervisor 1134 to perform an action to remedy or prevent the DDOS attack from having an effect on the host device 1104. In some cases, when the second device is part of the monitored data center 1120, the ML detection system 118 can send a command to shut down or otherwise limit the second device from performing the DDOS attack.

In at least one embodiment, the host device 1106 includes a DPU 1138, a hypervisor 1140, and multiple VMs 1142. In this embodiment, the ML training platform 1118 can send the alert 1156 to the DPU 1138 to perform an action to remedy or prevent the DDOS attack from having an effect on the host device 1106.

As described above, the three host devices 1104-1108 are shown for three different scenarios where the switch 1102 can be used as part of an attack detection framework. In the first scenario, the host device 1104 does not use a DPU; rather, the NIC 1132 is used for the network traffic to and from the switch 1102. In this scenario, the switch 1102 (e.g., a TOR switch) implements the ML detection system 118 to detect whether the host device 1104 is subject to a DDOS attack, and the ML detection system 118 can command the hypervisor 1134 to take action on a malicious resource (e.g., one of the VMs).

In the second scenario, the host device 1106 uses the DPU 1138 for the network traffic to and from the switch 1102. In this scenario, the DPU 1138 cannot be used for offload detection, or there is a requirement to run inference in a location of training data streaming (i.e., the switch 1102). In this scenario, the switch 1102 (e.g., a TOR switch) implements the ML detection system 118 to detect whether the host device 1106 is subject to a DDOS attack, and the ML detection system 118 can command the DPU 1138 to take action on a malicious resource (e.g., one of the VMs).

In the third scenario, the host device 1108 uses the DPU 1144 to offload detection (and optionally action). In this scenario, the DPU 1144 cannot stream (cannot offload streaming), and there is no requirement to run inference in a location of training data streaming (i.e., the switch 1102). In this scenario, the DPU 1144 implements the ML detection system 118 to determine whether the host device 1108 is subject to a DDOS attack, and the ML detection system 118 can command the DPU 1144 to take action on a malicious resource (e.g., one of the VMs). In at least one embodiment, the ML training platform 1118 can send an alert 1162 to the management platform 1116. The management platform 1116 can send an enforcement rule 1164 back to the DPU 1144. Alternatively, the management platform 1116 can send other commands to perform other actions for mitigation or prevention in view of the detected attack. This scenario is similar to the DPU-based system architectures described above, where the ML detection system 118 is implemented in a DPU. In this scenario, the switch 1102 can be used as a streaming point to gather data for training the ML model(s) as described below.

In at least one embodiment, the switch 1102 can be used to collect network data for training one or more ML models 1130. In this embodiment, the network monitoring logic 1112 can use offloaded sFlow technology to redirect or send sFlow data from the switch 1102 to an ML training platform 1118. The ML training platform 1118 can be located in a cloud computing system 1122. Alternatively, the ML training platform 1118 can be located in other locations. The ML training platform 1118 can use a streaming pipeline 1126 (e.g., Kafka technology) to process sFlow data received from the switch 1102. In at least one embodiment, the network monitoring logic 1112 can send the sFlow data to a dataflow collector 1110, which collects flow data from one or more switches. The dataflow collector 1110 can send the flow data to the streaming pipeline 1126. The streaming pipeline 1126 can store the flow data in a data store 1124. A trainer 1128 can access the flow data in the data store 1124 to train one or more ML models 1130. The one or more ML models 1130 can be deployed to the switch 1102 or the host device 1108. In at least one embodiment, model sourcing can be used to automatically deploy the one or more ML models 1130 to the ML detection system 118. The model sourcing can also update the one or more ML models 1130 via release cycles.

In at least one embodiment, the network monitoring logic 1112 can collect flow data by sampling packets that pass through it. The flow data can include information about network traffic flows, such as source and destination addresses, protocols, and other relevant metrics. Instead of keeping the flow data within the switch 1102, the flow data is sent or offloaded to an external system, such as dataflow collector 1110 and/or ML training platform 1118. The ML training platform 1118 has the capacity to process and analyze large volumes of flow data. The ML training platform 1118 can receive and process the offloaded flow data. The ML training platform 1118, via the trainer 1128, can perform various operations to train or update the one or more ML models 1130. The ML training platform 1118 can store the flow data in the data store 1124 for historical records. This historical data can be useful for identifying trends, assessing network changes over time, and generating the one or more ML models 1130. Offloading the flow data (e.g., sFlow data) can reduce the processing load on the switch 1102, allowing it to focus on its primary role of routing or switching network traffic. The offloading allows for centralized monitoring and analysis of the flow data from multiple network devices across an organization, providing a holistic view of an entire network. The ML training platform 1118 can also be used to scale more effectively to handle higher volumes of flow data.

In at least one embodiment, the switch includes multiple port interfaces, memory to store instructions, and a CPU operatively coupled to the memory and the port interfaces. The CPU can execute the instructions to perform operation, including, extracting a plurality of features from network traffic data received over at least one of the plurality of port interfaces and directed to a host device (e.g., host device 1104 and host device 1106) from a second device. The switch can determine, using an ML detection system, that the host device is subject to a DDOS attack based on the plurality of features extracted from the network traffic data. The switch can provide an alert of the DDOS attack to the host device in response to a determination that the host device is subject to the DDOS attack. In at least one embodiment, the plurality of features includes one or more of the following: a source media access control (MAC) address; a destination MAC address; a source internet protocol (IP) address; a destination IP address; a source port; a destination port; a protocol identifier; a packet size; or a maximum packet size.

In at least one embodiment, the ML detection system includes a tree-based ML model trained to determine whether the host device is subject to the DDOS attack based on the plurality of features. In at least one embodiment, the ML detection system includes a regression model trained to predict whether the host device is subject to the DDOS attack based on the plurality of features.

In at least one embodiment, the CPU can send an enforcement rule to the host device in response to a determination that the host device is subject to the DDOS attack. In at least one embodiment, the CPU can provide the alert to a DPU of the host device (e.g., DPU 1138 of the host device 1106). The alert can cause the DPU to perform an action associated with an enforcement rule. In at least one embodiment, the CPU can provide the alert to a hypervisor executed by the host device (e.g., hypervisor 1134 of the host device 1104). The host device can include a NIC. The alert can cause the hypervisor to perform an action associated with an enforcement rule.

In at least one embodiment, the switch includes an acceleration hardware engine and network monitoring logic. The acceleration hardware engine can implement the ML detection system. The network monitoring logic can extract the plurality of features from the network traffic data and send the plurality of features to the ML detection system to determine whether the host device is subject to the DDOS attack. In at least one embodiment, the acceleration hardware engine can receive the plurality of features from the network monitoring logic. The acceleration hardware engine can determine whether the host device is subject to the DDOS attack using a regression model trained to predict whether the host device is subject to the DDOS attack based on the plurality of features. The acceleration hardware engine can send the alert to the host device, responsive to the determination that the host device is subject to the DDOS attack. In another embodiment, the acceleration hardware engine can use a tree-based ML model trained to determine whether the host device is subject to the DDOS attack based on the plurality of features.

In at least one embodiment, a network device includes a network interface, a host interface, and a processing device operatively coupled to the network interface and the host interface. The network device can be a switch coupled to the host device. The network device can be a NIC coupled to the host device. The processing device can extract a plurality of features from network traffic data received over the network interface and directed to a host device from a second device. The processing device can determine, using an ML detection system, that the host device is subject to a DDOS attack based on the plurality of features extracted from the network traffic data. The processing device can provide an alert of the DDOS attack to the host device in response to a determination that the host device is subject to the DDOS attack.

FIG. 12 is a flow diagram of a method 1200 of determining whether a host device is subject to a DDOS attack in accordance with one embodiment. The processing logic can be a combination of hardware, firmware, software, or any combination thereof. In at least one embodiment, method 1200 may be performed by processing logic of switch 1102 of FIG. 11. In at least one embodiment, method 1200 may be performed by multiple processing threads, each thread executing one or more individual functions, routines, subroutines, or operations of the method. In at least one embodiment, processing threads implementing method 1200 may be synchronized (e.g., using semaphores, critical sections, and/or other thread synchronization logic). Alternatively, processing threads implementing method 1200 may be executed asynchronously with respect to each other. Various operations of method 1200 may be performed differently than the order shown in FIG. 12. Some operations of the methods may be performed concurrently with other operations. In at least one embodiment, one or more operations shown in FIG. 12 may not always be performed.

Referring to FIG. 12, the processing logic begins with the processing logic (e.g., a switch coupled to a host device) extracting a plurality of features from network traffic data received on a port interface of the switch, the network traffic data being directed to the host device from a second device. At block 1204, the processing logic determines, using an ML detection system, whether the host device is subject to a DDOS attack based on the plurality of features. At block 1206, the processing logic causes an action associated with an enforcement rule to be performed on subsequent network traffic data directed to the host device from the second device, responsive to a determination that the host device is subject to the DDOS attack.

In at least one embodiment, the processing logic at block 1204, uses a regression model trained to predict whether the host device is subject to the DDOS attack based on the plurality of features. In at least one embodiment, the processing logic at block 1204, uses a tree-based ML model trained to determine whether the host device is subject to the DDOS attack based on the plurality of features.

In at least one embodiment, the ML detection system is implemented in the switch. In at least one embodiment, the ML detection system is implemented in an acceleration hardware engine coupled to the switch.

In at least one embodiment, the processing logic at block 1206 causes the action to be performed by sending an alert to a DPU of the host device. The DPU can perform the action associated with the enforcement rule. In at least one embodiment, the processing logic at block 1206 causes the action to be performed by sending an alert to a hypervisor executed by the host device. The hypervisor can perform the action associated with the enforcement rule.

In at least one embodiment, the plurality of features includes one or more of the following: a source MAC address, a destination MAC address, a source IP address, a destination IP address, a source port, a destination port, a protocol identifier, a packet size, a maximum packet size, or the like.

Other variations are within the spirit of the present disclosure. Thus, while disclosed techniques are susceptible to various modifications and alternative constructions, certain illustrated embodiments thereof are shown in drawings and have been described above in detail. It should be understood, however, that there is no intention to limit the disclosure to a specific form or forms disclosed, but on the contrary, the intention is to cover all modifications, alternative constructions, and equivalents falling within the spirit and scope of the disclosure, as defined in appended claims.

Use of terms "a" and "an" and "the" and similar referents in the context of describing disclosed embodiments (especially in the context of the following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. The term "connected," when unmodified and referring to physical connections, is to be construed as partly or wholly contained within, attached to, or joined together, even if there is something intervening. Recitations of ranges of values herein are merely intended to serve as a shorthand method of referring individually to each separate value falling within the range unless otherwise indicated herein, and each separate value is incorporated into the specification as if it were individually recited herein. Use of the term "set" (e.g., "a set of items") or "subset," unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but subset and corresponding set may be equal.

Conjunctive language, such as phrases of the form "at least one of A, B, and C," or "at least one of A, B, and C,"

unless specifically stated otherwise or otherwise clearly contradicted by context, is otherwise understood with the context as used in general to present that an item, term, etc., may be either A or B or C, or any nonempty subset of a set of A and B and C. For instance, in the illustrative example of a set having three members, conjunctive phrases "at least one of A, B, and C" and "at least one of A, B, and C" refers to any of the following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, the term "plurality" indicates a state of being plural (e.g., "a plurality of items" indicates multiple items). A plurality is at least two items but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause a computer system to perform operations described herein. A set of non-transitory computer-readable storage media, in at least one embodiment, comprises multiple non-transitory computer-readable storage media, and one or more individual non-transitory storage media of multiple non-transitory computer-readable storage media lack all of the code while multiple non-transitory computer-readable storage media collectively store all of the code. In at least one embodiment, executable instructions are executed such that different instructions are executed by different processors—for example, a non-transitory computer-readable storage medium stores instructions, and a main CPU executes some of the instructions while a GPU executes other instructions. In at least one embodiment, different components of a computer system have separate processors, and different processors execute different subsets of instructions.

Accordingly, in at least one embodiment, computer systems are configured to implement one or more services that singly or collectively perform operations of processes described herein, and such computer systems are configured with applicable hardware and/or software that enable the performance of operations. Further, a computer system that implements at least one embodiment of present disclosure is a single device and, in another embodiment, is a distributed computer system comprising multiple devices that operate differently such that the distributed computer system performs operations described herein and such that a single device does not perform all operations.

Use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the present disclosure.

All references, including publications, patent applications, and patents, cited herein are hereby incorporated by reference to the same extent as if each reference were individually and specifically indicated to be incorporated by reference and were set forth in its entirety herein.

The terms "coupled" and "connected," along with their derivatives, may be used in the description and claims. It should be understood that these terms may not be intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other but yet still co-operate or interact with each other.

Unless specifically stated otherwise, it may be appreciated that throughout the specification, terms such as "processing," "computing," "calculating," "determining," or the like, refer to the action and/or processes of a computer or computing system or similar electronic computing devices, that manipulate and/or transform data represented as physical, such as electronic, quantities within a computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, a "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes for carrying out instructions in sequence or parallel, continuously or intermittently. The terms "system" and "method" are used herein interchangeably insofar as a system may embody one or more methods, and methods may be considered a system.

In the present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways, such as by receiving data as a parameter of a function call or a call to an application programming interface. In some implementations, the process of obtaining, acquiring, receiving, or inputting analog or digital data can be accomplished by transferring data via a serial or parallel interface. In another implementation, the process of obtaining, acquiring, receiving, or inputting analog or digital data can be accomplished by transferring data via a computer network from a providing entity to an acquiring entity.

References may also be made to providing, outputting, transmitting, sending, or presenting analog or digital data. In various examples, the process of providing, outputting, transmitting, sending, or presenting analog or digital data can be accomplished by transferring data as an input or output parameter of a function call, a parameter of an application programming interface, or an interprocess communication mechanism.

Although the discussion above sets forth example implementations of described techniques, other architectures may be used to implement the described functionality and are intended to be within the scope of this disclosure. Furthermore, although specific distributions of responsibilities are defined above for purposes of discussion, various functions and responsibilities might be distributed and divided in different ways, depending on circumstances.

Furthermore, although the subject matter has been described in language specific to structural features and/or methodological acts, it is to be understood that the subject matter claimed in the appended claims is not necessarily limited to the specific features or acts described. Rather, the specific features and acts are disclosed as exemplary forms of implementing the claims.

What is claimed is:

1. A switch comprising:
an acceleration hardware engine;
a plurality of port interfaces;
memory to store instructions and a configuration file that specifies one or more filters that extract for inclusion or remove from inclusion specified types of data; and
a central processing unit (CPU) operatively coupled to the memory and the plurality of port interfaces, wherein the CPU is to execute the instructions to:
receive a copy of network data received over at least one of the plurality of port interfaces and directed to a host device;
apply the one or more filters to the copy of the network data to obtain filtered network data, wherein the filtered network data comprises network packets directed to the host device, wherein at least some of the network packets are directed to the host device from another device;
sample at least a portion of the network packets;
generate one or more flow records comprising information about the sampled portion of the network packets, the information comprising at least a destination port, and the one or more flow records representing behavior of network traffic directed to the host device;
extract a plurality of features from the one or more flow records;
determine, using a machine learning (ML) detection system implemented by the acceleration hardware engine, that the host device is subject to a distributed denial of service (DDoS) attack based on the plurality of features; and
provide an alert of the DDoS attack to the host device in response to a determination that the host device is subject to the DDoS attack, the alert to cause an action associated with an enforcement rule to be performed at the host device.

2. The switch of claim 1, wherein the ML detection system comprises a tree-based ML model trained to determine whether the host device is subject to the DDoS attack based on the plurality of features.

3. The switch of claim 1, wherein the ML detection system comprises a regression model trained to predict whether the host device is subject to the DDoS attack based on the plurality of features.

4. The switch of claim 1, wherein the CPU is to send the enforcement rule to the host device in response to a determination that the host device is subject to the DDoS attack.

5. The switch of claim 1, wherein the CPU is to provide the alert to a data processing unit (DPU) of the host device, and wherein the alert is to cause the DPU to perform the action associated with the enforcement rule.

6. The switch of claim 1, wherein the CPU is to provide the alert to a hypervisor executed by the host device, the host device comprising a network interface card (NIC), and wherein the alert is to cause the hypervisor to perform the action associated with the enforcement rule.

7. The switch of claim 1, wherein the plurality of features comprises at least one of a source media access control (MAC) address, a destination MAC address, a source internet protocol (IP) address, a destination IP address, a source port, the destination port, a protocol identifier, a packet size, or a maximum packet size.

8. The switch of claim 1, further comprising:
network monitoring logic to extract the plurality of features and send the plurality of features to the ML detection system to determine whether the host device is subject to the DDoS attack.

9. The switch of claim 8, wherein the acceleration hardware engine is to:
receive the plurality of features from the network monitoring logic;
determine whether the host device is subject to the DDoS attack using a regression model trained to predict whether the host device is subject to the DDoS attack based on the plurality of features; and
send the alert to the host device responsive to the determination that the host device is subject to the DDoS attack.

10. The switch of claim 8, wherein the acceleration hardware engine is to:
receive the plurality of features from the network monitoring logic;
determine whether the host device is subject to the DDoS attack using a tree-based ML model trained to determine whether the host device is subject to the DDoS attack based on the plurality of features; and
send the alert to the host device responsive to the determination that the host device is subject to the DDoS attack.

11. The switch of claim 1, wherein the information further comprises at least one of a source port, a source address, a destination address, a protocol type, or a packet counter.

12. A method comprising:
storing, at a switch, a configuration file that specifies one or more filters that extract for inclusion or remove from inclusion specified types of data;
receiving, at a central processing unit (CPU) of the switch, a copy of network data received over at least one of a plurality of port interfaces of the switch and directed to a host device;
applying the one or more filters to the copy of the network data to obtain filtered network data, wherein the filtered network data comprises network packets directed to the host device, wherein at least some of the network packets are directed to the host device from another device;
sampling at least a portion of the network packets;

generating one or more flow records comprising information about the sampled portion of the network packets, the information comprising at least a destination port, and the one or more flow records representing behavior of network traffic directed to the host device;

extracting a plurality of features from the one or more flow records;

determining, using a machine learning (ML) detection system implemented by an acceleration hardware engine of the switch, whether the host device is subject to a distributed denial of service (DDoS) attack based on the plurality of features; and causing an action associated with an enforcement rule to be performed at the host device on subsequent network traffic data directed to the host device from the other device, responsive to a determination that the host device is subject to the DDoS attack.

13. The method of claim 12, wherein the information further comprises at least one of a source port, a source address, a destination address, a protocol type, or a packet counter.

14. The method of claim 12, wherein causing the action to be performed comprises sending an alert to a hypervisor executed by the host device, and wherein the hypervisor is to perform the action associated with the enforcement rule.

15. The method of claim 12, wherein the plurality of features comprises at least one of a source media access control (MAC) address, a destination MAC address, a source internet protocol (IP) address, a destination IP address, a source port, the destination port, a protocol identifier, a packet size, or a maximum packet size.

16. The method of claim 12, wherein causing the action to be performed comprises sending an alert to a data processing unit (DPU) of the host device, and wherein the DPU is to perform the action associated with the enforcement rule.

17. The method of claim 16, wherein determining whether the host device is subject to the DDoS attack comprises using a tree-based ML model trained to determine whether the host device is subject to the DDoS attack based on the plurality of features.

18. The method of claim 16, wherein determining whether the host device is subject to the DDoS attack comprises using a regression model trained to predict whether the host device is subject to the DDoS attack based on the plurality of features.

19. A network device comprising:

a network interface;

a host interface;

an acceleration hardware engine;

a processing device operatively coupled to the network interface and the host interface, wherein the processing device is to:

receive a copy of network data received over the network interface and directed to a host device coupled to the host interface;

apply one or more filters to the copy of the network data to obtain filtered network data, wherein the filtered network data comprises network packets directed to the host device, wherein at least some of the network packets are directed to the host device from another device;

sample at least a portion of the network packets;

generate one or more flow records comprising information about the sampled portion of the network packets, the information comprising at least a destination port, and the one or more flow records representing behavior of network traffic directed to the host device;

extract a plurality of features from the one or more flow records;

determine, using a machine learning (ML) detection system implemented by the acceleration hardware engine, that the host device is subject to a distributed denial of service (DDoS) attack based on the plurality of features; and provide an alert of the DDoS attack to the host device in response to a determination that the host device is subject to the DDoS attack, the alert to cause an action associated with an enforcement rule to be performed at the host device.

20. The network device of claim 19, wherein the network device is a network interface card (NIC) coupled to the host device.

21. The network device of claim 19, wherein the network device is a switch coupled to the host device.

22. The network device of claim 19, wherein the information further comprises at least one of a source port, a source address, a destination address, a protocol type, or a packet counter.

\* \* \* \* \*